United States Patent
Amin et al.

(10) Patent No.: US 10,556,826 B2
(45) Date of Patent: Feb. 11, 2020

(54) METHODS FOR REGENERATING LITHIUM-ENRICHED SALT BATHS

(71) Applicant: CORNING INCORPORATED, Corning, NY (US)

(72) Inventors: Jaymin Amin, Corning, NY (US); Xiaoju Guo, Painted Post, NY (US); Todd LeRoy Heck, Millerton, PA (US); Hongmei Hu, Painted Post, NY (US); Yuhui Jin, Painted Post, NY (US); Pascale Oram, Hammondsport, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/777,422

(22) PCT Filed: Nov. 18, 2016

(86) PCT No.: PCT/US2016/062664
§ 371 (c)(1),
(2) Date: May 18, 2018

(87) PCT Pub. No.: WO2017/087742
PCT Pub. Date: May 26, 2017

(65) Prior Publication Data
US 2018/0362399 A1    Dec. 20, 2018

Related U.S. Application Data

(60) Provisional application No. 62/372,497, filed on Aug. 9, 2016, provisional application No. 62/272,903, filed
(Continued)

(51) Int. Cl.
*C03C 3/097* (2006.01)
*C03C 21/00* (2006.01)
(Continued)

(52) U.S. Cl.
CPC ............. *C03C 21/002* (2013.01); *B01J 39/02* (2013.01); *B01J 39/14* (2013.01); *C03C 3/097* (2013.01); *C03C 4/18* (2013.01); *C03C 2204/00* (2013.01)

(58) Field of Classification Search
CPC .................................................. C03C 21/002
See application file for complete search history.

(56) References Cited

U.S. PATENT DOCUMENTS 3,410,653 A    11/1968 Theordore
3,441,398 A    4/1969 Hess
(Continued)

FOREIGN PATENT DOCUMENTS

| | | |
|---|---|---|
| JP | 2015129063 A | 7/2015 |
| WO | 2014045977 A1 | 3/2014 |
| WO | 2015080095 A1 | 6/2015 |

OTHER PUBLICATIONS

International Search Report and Written Opinion of the International Searching Authority; PCT/US2016/062664; dated Mar. 6, 2017; 14 Pages; Korean Intellectual Property Office.
(Continued)

*Primary Examiner* — Peter Keyworth
(74) *Attorney, Agent, or Firm* — Payal Patel; Jeffrey A. Schmidt

(57) ABSTRACT

Methods for regenerating poisoned salt bath comprising providing a salt bath comprising at least one of $KNO_3$ and $NaNO_3$, providing an ion-exchangeable substrate comprising lithium cations, contacting at least a portion of the ion-exchangeable substrate with the salt bath, whereby lithium cations in the salt bath diffuse from the ion-exchangeable substrate and are dissolved in the salt bath, and selectively precipitating dissolved lithium cations from the salt bath using phosphate salt. The methods further include preventing or reducing the formation of surface defects in
(Continued)

the ion-exchangeable substrate by preventing or reducing the formation of crystals on the surface of the ion-exchangeable substrate upon removal from the salt bath.

17 Claims, 16 Drawing Sheets

Related U.S. Application Data on Dec. 30, 2015, provisional application No. 62/258,114, filed on Nov. 20, 2015.

(51) Int. Cl.
*B01J 39/02* (2006.01)
*B01J 39/14* (2006.01)
*C03C 4/18* (2006.01)

(56) References Cited

U.S. PATENT DOCUMENTS

| | | |
|---|---|---|
| 3,879,274 A | 4/1975 | Matsumori et al. |
| 4,021,218 A | 5/1977 | Watanabe |
| 4,218,230 A | 8/1980 | Hogan |
| 8,919,150 B2 | 12/2014 | Imai et al. |
| 2012/0052271 A1* | 3/2012 | Gomez ............... C03C 3/091 |
| | | 428/213 |

OTHER PUBLICATIONS

Volkovich et al; "Treatment of Molten Salt Wastes by Phosphate Precipitation: Removal of Fission Product Elements After Pyrochemical Reprocessing of Spent Nuclear Fuels in Chloride Melts"; Journal of Nuclear Materials, 323 (2003) 49-56.

* cited by examiner

METHODS FOR REGENERATING LITHIUM-ENRICHED SALT BATHS

CROSS-REFERENCE TO RELATED APPLICATIONS

This application is a national stage entry of International Patent Application Serial No. PCT/US2016/062664, filed on Nov. 18, 2016, which claims the benefit of priority of U.S. Provisional Patent Application Ser. No. 62/372,497 filed on Aug. 9, 2016, U.S. Provisional Patent Application Ser. No. 62/272,903 filed on Dec. 30, 2015 and U.S. Provisional Patent Application Ser. No. 62/258,114 filed on Nov. 20, 2015, the contents of each of which are relied upon and incorporated herein by reference in their entireties.

TECHNICAL FIELD

The present disclosure generally relates to methods for regenerating lithium-enriched salt baths. More particularly, the disclosure relates to methods for using phosphate salts to remove lithium cations from salt baths used in ion exchange processes for strengthening glass and glass-ceramic substrates while preventing or reducing the formation of surface defects.

BACKGROUND

Tempered or strengthened glass is often used in consumer electronic devices, such as smart phones and tablets, due to its physical and chemical durability and toughness. In general, the durability of tempered glass and glass-ceramic substrates is increased by the increasing amount of compressive stress (CS) and depth of layer (DOL) of the glass or glass-ceramic substrate. To provide a larger CS and deepen the DOL, ion exchange processes may be used to strengthen glass or glass-ceramic substrates. In ion exchange processes, a glass or glass-ceramic substrate containing at least one smaller alkali metal cation is immersed in a salt bath containing at least one larger alkali metal cation. The smaller alkali metal cations diffuse from the glass surface into the salt bath while larger alkali metal cations from the salt bath replace the smaller cations in the surface of the glass. This substitution of larger cations for smaller cations in the glass generates a layer of compressive stress layer in the surface of the glass, thus increasing the resistance of the glass to breakage.

As the ion exchange proceeds, the salt concentration of the smaller alkali metal cations (i.e., the cations that diffuse from the glass into the salt) increases while the salt bath concentration of the larger alkali metal cations (i.e., the cations that migrate into the glass from the salt) decreases. This fluctuation in the ion concentration may cause unwanted constituents to form, which can age or "poison" the salt bath, or cause salt crystals to form and adhere to the surface of the glass. A poisoned salt bath will not produce a large CS and deep DOL in the glass substrate, as desired. Likewise, crystals on the surface of the glass can form defects—including depressions and protrusions. Dimpled, stippled glass, and glass that is not properly strengthened is not commercially desired and may be unsuitable for use in some industries

SUMMARY

Embodiments herein address these needs by providing methods for regenerating salt baths by selectively precipitating dissolved lithium cations from the salt bath to prevent and remedy salt bath poisoning while preventing or reducing surface defects.

In embodiments, methods for regenerating a salt bath include heating a salt bath with a phosphate salt and at least one of $KNO_3$ and $NaNO_3$. The salt bath is heated to a temperature of greater than or equal to 360° C. to less than or equal to 430° C. and an ion-exchangeable substrate is brought into contact with the salt bath. As the ion exchange process begins, the lithium cations diffuse from the ion-exchangeable substrate and are dissolved in the salt bath. The phosphate salt selectively precipitates the lithium cations from the salt bath, keeping the concentration of dissolved lithium cations in the salt bath less than or equal to 2.0 weight percent (wt %) lithium.

In some embodiments, methods for regenerating a salt bath include contacting a salt bath with from greater than or equal to 0.10 wt % to less than or equal to 5.0 wt % of a phosphate salt and at least one of $KNO_3$ and $NaNO_3$ with an ion-exchangeable substrate. As the ion exchange process begins, the lithium cations diffuse from the ion-exchangeable substrate and are dissolved in the salt bath. The lithium cations diffuse from the ion-exchangeable substrate at a rate of greater than or equal to 1,000 $\mu m^2/hr$ and less than or equal to 8,000 $\mu m^2/hr$. The phosphate salt selectively precipitates the diffused lithium cations from the salt bath, keeping the concentration of dissolved lithium cations in the salt bath less than or equal to 2.0 wt % lithium.

In embodiments, methods for regenerating a salt bath include heating a salt bath comprising at least one of $KNO_3$ and $NaNO_3$ to a temperature of greater than or equal to 360° C. and less than or equal to 430° C. At least a portion of a first ion-exchangeable substrate comprising lithium is contacted with the salt bath, and lithium cations diffuse from the ion-exchangeable substrate and dissolve in the salt bath. The compressive stress of the first ion-exchangeable substrate is measured after the first ion-exchangeable substrate is contacted with the salt bath. At least a portion of subsequent ion-exchangeable substrates comprising lithium are contacted with the salt bath, and again lithium cations diffuse from the subsequent ion-exchangeable substrates and dissolve in the salt bath. The subsequent compressive stresses of the subsequent ion-exchangeable substrates are measured after they are contacted with the salt bath, and phosphate salt is added to the salt bath when the compressive stress of a subsequent ion-exchangeable substrate is 10 MPa to 70 MPa less than the compressive stress of the first ion-exchangeable substrate. Dissolved lithium cations are selectively precipitated from the salt bath, such that the concentration of dissolved lithium in the salt bath is greater than or equal to 0 wt % lithium and less than or equal to 2.0 wt % lithium.

DETAILED DESCRIPTION

Figure 1B:
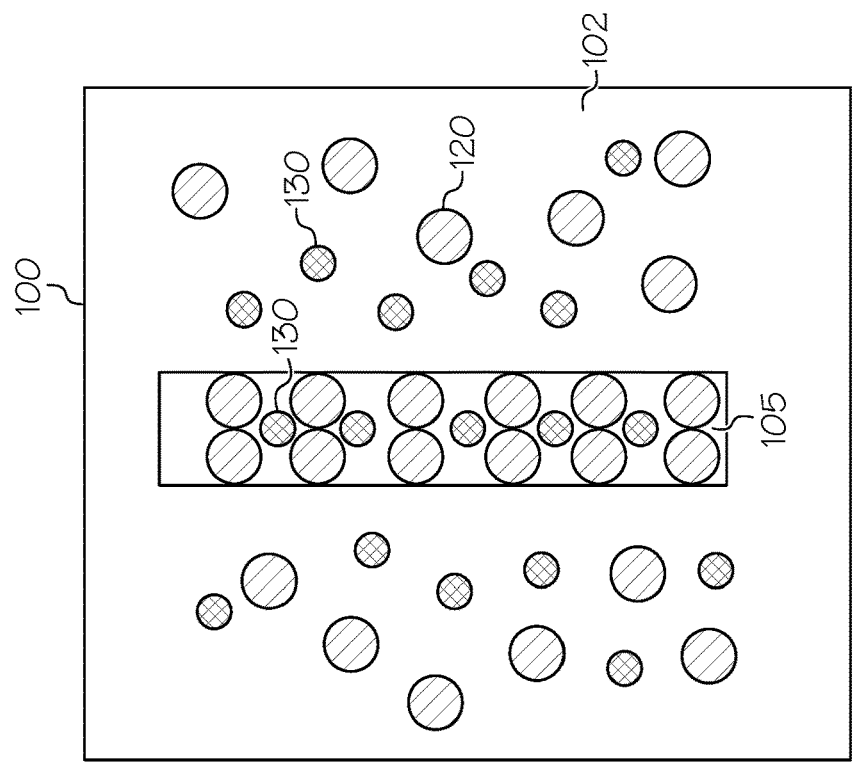
FIG. 1B schematically depicts a salt bath during an ion exchange process after lithium poisoning.

Embodiments described herein are directed to methods for regenerating lithium-poisoned salt baths used in ion exchange processes to strengthen lithium-containing glass and glass-ceramic substrates while preventing or reducing the formation of surface defects. The embodiments include providing a salt bath comprising at least one of $KNO_3$ and $NaNO_3$ and an ion-exchangeable substrate comprising lithium cations, contacting at least a portion of the ion-exchangeable substrate with the salt bath to cause lithium cations in the salt bath to diffuse from the ion-exchangeable substrate and into the salt bath, and selectively precipitating the dissolved lithium cations from the salt bath with a phosphate salt.

As used herein, the terms "ion exchange bath," "salt bath," and "molten salt bath," are, unless otherwise specified, equivalent terms, and refer to the solution or medium used to effect the ion exchange process with a glass or glass-ceramic substrate, in which cations within the surface of a glass or glass-ceramic substrate are replaced or exchanged with cations that are present in the salt bath. It is understood that in some embodiments the salt bath comprises at least one of $KNO_3$ and $NaNO_3$, may be liquefied by heat or otherwise heated beyond a substantially solid phase.

As used herein, the terms "substrate" and "article" are, unless otherwise specified, equivalent terms, referring to a glass or glass-ceramic material of any shape or form including, but not limited to, sheets, vials, and three dimensional glass articles.

As used herein, the terms "cation" and "ion" are considered equivalent terms, unless otherwise specified. The terms "cation" and "ion" can also refer to one or more cations. While potassium and sodium cations and salts are used in embodiments, it is understood that all embodiments of the disclosure are not limited to these species. The scope of the present disclosure also includes other metal salts and ions, particularly cations and salts of the alkali metals, as well as those of other monovalent metals.

As used herein, the terms "selectively" and "selective" are used to refer to the affinity for a product or reaction mechanism to be promoted, such that the particular product or reaction mechanism occurs over other potential products or reactions.

As used herein, the term "diffusivity" refers to the molar flux of a species due to molecular diffusion or concentration gradient of the particular species.

As used herein, the terms "granular" or "granulated" refers to a composition comprising distinguishable pieces or grains with discrete components. [INVENTORS: PLEASE CONFIRM OR MODIFY THIS DEFINITION.]

As used herein, the singular forms "a," "an" and "the" include plural referents unless the context clearly dictates otherwise. Thus, for example, reference to "a" component includes aspects having two or more such components, unless the context clearly indicates otherwise.

Specific embodiments will now be described with reference to the figures. The following description of the embodiments is illustrative in nature and is in no way intended to be limiting in its application or use. Furthermore, it should be understood that like reference numbers indicate corresponding or related parts in the various figures.

Figure 1A:
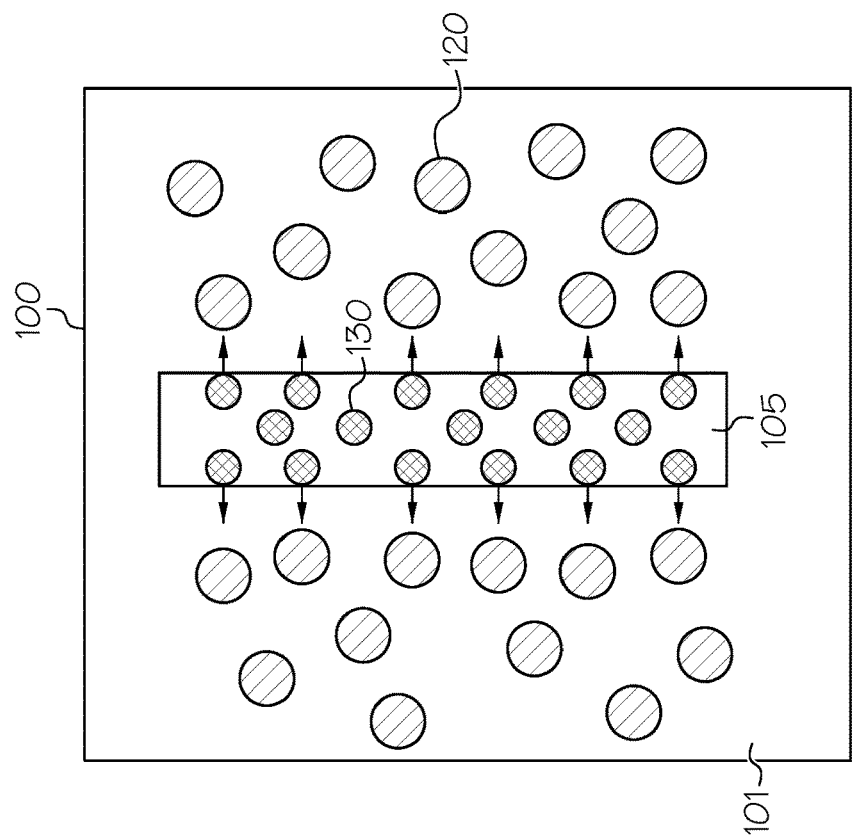
FIG. 1A schematically depicts a salt bath during an ion exchange process before lithium poisoning according to embodiments disclosed and described herein.

FIGS. 1A and 1B schematically depict a salt bath 100 during an ion exchange process before and after lithium poisoning. The salt bath 100 contains larger alkali metal cations 120, which will be exchanged with smaller alkali metal cations, depicted as lithium cations 130, present in the ion-exchangeable substrate 105. As the smaller alkali metal cations in the ion-exchangeable substrate 105 are exchanged with the larger alkali cations present in the salt bath 100, a layer of compressive stress is generated in the surface of the ion-exchangeable substrate 105. This compressive stress layer may inhibit both crack formation and crack propagation.

In some embodiments, the salt bath 100 may comprise at least one of $KNO_3$ and $NaNO_3$. In some embodiments, the salt bath 100 may comprise a combination of $KNO_3$ and $NaNO_3$. The combination of $KNO_3$ and $NaNO_3$ may be selected based on the desired application. $KNO_3$— when compared to $NaNO_3$— comprises a larger alkali metal cation (i.e., $K^+$ compared to $Na^+$) that will more readily exchange with larger alkali metal cations in the glass substrate, such as $Na^+$. Likewise, $NaNO_3$— when compared to $KNO_3$— comprises a smaller alkali metal cation (i.e., $Na^+$ compared to $K^+$) that more readily exchange with smaller alkali metal cations in the glass substrate. Accordingly, in some embodiments, the concentrations of $KNO_3$ and $NaNO_3$ in the salt bath may be balanced based on the composition of the ion-exchangeable substrate 105 to provide an ion exchange process that increases both the CS and DOL in the ion-exchangeable substrate 105. For example, the salt bath 100 may comprise from greater than or equal to 40 mol % and less than or equal to 95 mol % $KNO_3$, and from greater than or equal to 5 mol % and less than or equal to mol 60% $NaNO_3$. In some embodiments, the salt bath 100 may comprise from greater than or equal to 45 mol % to less than or equal to 50 mol % $KNO_3$, and from greater than or equal to 50 mol % to less than or equal to 55 mol % $NaNO_3$. In some embodiments, the salt bath 100 may comprise from greater than or equal to 75 mol % $KNO_3$ to less than or equal to 95 mol % $KNO_3$ and from greater than or equal to 5 mol % $NaNO_3$ to less than or equal to 25 mol % $NaNO_3$. In some embodiments, the salt bath 100 may comprise greater than or equal to 45 mol % $KNO_3$ and less than or equal to 67 mol % $KNO_3$, and greater than or equal to 33 mol % $NaNO_3$ and less than or equal to 55 mol % $NaNO_3$.

The ion exchange process may be promoted, in some embodiments, by heating the salt bath 100. If the temperature of the salt bath 100 is increased too much, it may be difficult to adequately control the ion exchange process and the DOL could increase too quickly without obtaining a good CS. Accordingly, the salt bath 100 may, in some embodiments, be heated to a temperature of greater than or equal to 360° C. and less than or equal to 430° C. In some embodiments, the salt bath 100 may be heated to a temperature of greater than or equal to 360° C. to less than or equal to 390° C., or of greater than or equal to 375° C. to less than or equal to 385° C., or of greater than or equal to 378° C. to less than or equal to 383° C., or of greater than or equal to 410° C. to less than or equal to 430° C. Alternatively, the salt bath 100 may be heated to a temperature of greater than or equal to 400° C. to less than or equal to 430° C., or greater than or equal to 425° C. to less than or equal to 435° C. The salt bath 100 may be heated to a temperature of 380° C. or to a temperature of 420° C.

In some embodiments, before, during, or following the ion exchange process, the salt bath 100 may have a pH of from less than or equal to 10 and greater than or equal to 6, as measured by dissolving 5 wt % of the molten salt in aqueous solution and measuring the pH at room temperature (a temperature from 20° C. to 25° C., such as 21° C.). In some embodiments, the salt bath 100 may be basic or alkaline, meaning that the salt bath may have a pH of greater than 7 at 25° C. In some embodiments, the salt bath 100 may have a pH of from less than or equal to 10 to greater than or equal to 7.5 or from less than or equal to 10 and greater than or equal to 8, or from less than or equal to 10 and greater than or equal to 9, as measured by dissolving 5 wt % of the molten salt in aqueous solution and measuring the pH at room temperature.

Although FIGS. 1A and 1B show the ion-exchangeable substrate 105 completely immersed in the salt bath 100, it should be understood that in embodiments, only a portion of the ion-exchangeable substrate 105 is contacted with the salt bath 100. The ion-exchangeable substrate 105 may be brought into contact with the molten salt through immersion in a salt bath 100, or through spraying, dipping, or other similar means of contacting the ion-exchangeable substrate 105 with the salt bath 100. In some embodiments, the ion-exchangeable substrate 105 may be fully submerged in the salt bath 100 or only a portion of the ion-exchangeable substrate 105 may be submerged in the salt bath 100. The ion-exchangeable substrate 105 may be brought into contact with the salt bath 100 multiple times, including but not limited to, dipping the ion-exchangeable substrate 105 into the salt bath 100.

At least a portion of the ion-exchangeable substrate 105 may be contacted with the salt bath 100 for a period of time of from 1 minute to 60 hours. At least a portion of the ion-exchangeable substrate 105 may be contacted with the salt bath 100 for a period of time of from 1 minute to 48 hours, or from 1 minute to 24 hours, or from 10 minutes to 24 hours, or from 10 minutes to 2 hours. In some embodiments, the ion-exchangeable substrate 105 may be contacted with the salt bath 100 for from 5 hours to 40 hours, or from 5 hours to 20 hours, or for 8 hours to 24 hours. In some embodiments, at least a portion of the ion-exchangeable substrate 105 may be contacted with the salt bath 100 for a period of time of from 10 minutes to 1 hour, or 10 minutes to 30 minutes, or from 1 hour to 3 hours.

In embodiments, the ion-exchangeable substrate 105 is a glass or glass-ceramic substrate or article. The glass or glass-ceramic substrate may, in some embodiments, comprise alkali aluminosilicate or alkali aluminoborosilicate glass. For example, in some embodiments, the ion-exchangeable substrate 105 may be formed from a glass composition which includes greater than or equal to 50 mol % $SiO_2$ and less than or equal to 80 mol % $SiO_2$, greater than or equal to 0 mol % $B_2O_3$ and less than or equal to 5 mol % $B_2O_3$, greater than or equal to 5 mol % $Al_2O_3$ and less than or equal to 30 mol % $Al_2O_3$, greater than or equal to 2 mol % $Li_2O$ and less than or equal to 25 mol % $Li_2O$, greater than or equal to 0 mol % $Na_2O$ and less than or equal to 15 mol % $Na_2O$, greater than or equal to 0 mol % MgO and less than or equal to 5 mol % MgO, greater than or equal to 0 mol % ZnO and less than or equal to 5 mol % ZnO, greater than or equal to 0 mol % $SnO_2$ and less than or equal to 5 mol % $SnO_2$, and greater than or equal to 0 mol % $P_2O_5$ and less than or equal to 10 mol % $P_2O_5$. Alternatively, the ion-exchangeable substrate may comprise greater than or equal to 60 mol % $SiO_2$ and less than or equal to 75 mol % $SiO_2$, greater than or equal to 0 mol % $B_2O_3$ and less than or equal to 3 mol % $B_2O_3$, greater than or equal to 10 mol % $Al_2O_3$ and less than or equal to 25 mol % $Al_2O_3$, greater than or equal to 2 mol % $Li_2O$ and less than or equal to 15 mol % $Li_2O$, greater than or equal to 0 mol % $Na_2O$ and less than or equal to 12 mol % $Na_2O$, greater than or equal to 0 mol % MgO and less than or equal to 5 mol % MgO, greater than or equal to 0 mol % ZnO and less than or equal to 5 mol % ZnO, greater than or equal to 0 mol % $SnO_2$ and less than or equal to 1 mol % $SnO_2$, and greater than or equal to 0 mol % $P_2O_5$ and less than or equal to 5 mol % $P_2O_5$. In some embodiments, the ion-exchangeable substrate 105 may not comprise $B_2O_3$, $P_2O_5$, MgO, ZnO, $SnO_2$, or combinations thereof. It should be understood that the aforementioned glass composition is one embodiment of a glass composition that may be used in the ion exchange process and that other lithium containing glass compositions for use with the methods described herein are contemplated and possible.

As mentioned, in embodiments, the ion-exchangeable substrate 105 comprises lithium cations 130. In some embodiments, the ion-exchangeable substrate 105 may comprise greater than or equal to 2.0 mol % $Li_2O$ and less than or equal to 25 mol % $Li_2O$. In other embodiments, the ion-exchangeable substrate 105 may comprise from greater than or equal to 2.0 mol % $Li_2O$ to less than or equal to 15 mol % $Li_2O$, or from greater than or equal to 2.0 mol % $Li_2O$ to less than or equal to 10 mol % $Li_2O$, or from greater than or equal to 2.5 mol % $Li_2O$ to less than or equal to 10 mol % $Li_2O$. In embodiments, the ion-exchangeable substrate 105 may comprise from greater than or equal to 5.0 mol % $Li_2O$ to less than or equal to 15 mol % $Li_2O$, or from greater than or equal to 5.0 mol % $Li_2O$ to less than or equal to 10 mol % $Li_2O$, or from greater than or equal to 5.0 mol % $Li_2O$ to less than or equal to 8 mol % $Li_2O$.

The amount of lithium present in the ion-exchangeable substrate 105 may allow for the ion exchange process to occur at a faster rate when compared to the ion exchange processes of other ion-exchangeable substrates that do not contain lithium. In some embodiments, lithium may more readily diffuse from the glass or glass-ceramic substrate and into the salt bath 100 than other alkali metal cations. In some embodiments, the ion-exchangeable substrate 105 may diffuse lithium cations 130 from the substrate at a rate of greater than or equal to 1,000 square micrometers per hour ($\mu m^2/hr$). The ion-exchangeable substrate 105 may diffuse lithium cations 130 from the substrate at a rate of greater than or equal to 1,500 $\mu m^2/hr$, greater than or equal to 1,800 $\mu m^2/hr$, greater than or equal to 2,000 $\mu m^2/hr$, greater than or equal to 2,200 $\mu m^2/hr$, or greater than or equal to 2,500 $\mu m^2/hr$. In each of the above embodiments, the ion-exchangeable substrate 105 may diffuse lithium cations 130 at a rate of less than or equal to 8,000 $\mu m^2/hr$, such as less than or equal to 6,000 $\mu m^2/hr$ or less than or equal to 4,000 $\mu m^2/hr$. Although the diffusion rate has been described using lithium, it should be understood that the diffusion rate of any alkali metal cation may be adjusted.

A fast diffusion rate of lithium cations 130 from the ion-exchangeable substrate 105 into the salt bath 100 may allow for a longer, and thus deeper, exchange of ions between the ion-exchangeable substrate 105 and the salt bath 100. The diffusion rate of lithium cations 130 in the ion exchange process may govern the rate at which the ion-exchangeable substrate 105 is strengthened (by increasing CS and DOL) and generally decrease the time of the ion exchange process and/or the contact with the salt bath 100 to achieve a specific CS and/or DOL. Therefore, in some embodiments, a high lithium cation 130 diffusion rate may be desired to decrease the time required for the ion exchange process. However, in some embodiments, a low lithium cation 130 diffusion rate may be desired to reduce or prevent the formation of surface defects on the ion-exchangeable substrate 105, as the increased presence of ions in the salt bath 100 due to the fast diffusion rate may tend to propagate the formation of phosphate crystals, which may produce more numerous surface defects, more visible surface defects, or both.

For example, in an embodiment, methods for reducing or preventing the formation of phosphate crystals, surface defects, or both, may include utilizing an ion-exchangeable substrate 105 with a low ion diffusion rate. The formation of phosphate crystals often occurs at the end of the ion exchange process after the concentration of lithium cations 130 present in the salt bath 100 has dissipated. Ion-exchangeable substrates 105 with low diffusion rates, such as a rate of less than or equal to 8,000 $\mu m^2/hr$ may allow for a slower, more shallow ion exchange, which may reduce or prevent phosphate crystal 247 formation. Therefore, in some embodiments, the ion-exchangeable substrate 105 may have a diffusion rate of less than or equal to 8,000 $\mu m^2/hr$ to prevent the formation of phosphate crystals 247 and may be greater than or equal to 1,000 $\mu m^2/hr$ to allow the ion-exchangeable substrate 105 to be properly strengthened during the ion exchange process. The diffusion rate may be from 1,000 $\mu m^2/hr$ to 6,000 $\mu m^2/hr$, or from 2,000 $\mu m^2/hr$ to 6,000 $\mu m^2/hr$, or from 3,000 $\mu m^2/hr$ to 5,000 $\mu m^2/hr$. In some embodiments, a diffusion rate of 8,000 $\mu m^2/hr$ may achieve an ion exchange depth of layer of 400 $\mu m$ in 5 hours, which, in some embodiments, may be the shortest time needed to achieve proper strengthening in an ion exchange reaction. In some embodiments, a diffusion rate of 1,000 $\mu m^2/hr$ may achieve an ion exchange depth of layer of 400 $\mu m$ in 40 hours, which may, in some embodiments, be the longest time needed proper strengthening in an ion exchange reaction.

The diffusion rate may be measured based on the equation listed below:

$$\text{Diffusion Rate } (\mu m^2/hr) = \text{Depth of Layer } (\mu m) \times \frac{\text{depth of layer } (\mu m)}{\text{time elapsed (hr)} \times 3.92} \quad \text{EQUATION 1}$$

As mentioned above, lithium may more readily diffuse from the ion-exchangeable substrate 105 than other alkali metals. In some embodiments, sodium may diffuse from the ion-exchangeable substrate 105 at a rate of from 100 $\mu m^2/hr$ to 800 $\mu m^2/hr$, or from 100 $\mu m^2/hr$ to 600 $\mu m^2/hr$, or from 200 $\mu m^2/hr$ to 500 $\mu m^2/hr$. Without being bound by any particular theory, the diffusion rate of the lithium cations 130, sodium cations, or both, may be controlled to prevent poisoning and to reduce salt crystal formation in the salt bath 100. In some embodiments, too high of a concentration of lithium cations 130, sodium cations, or both, may cause the fresh molten salt 101 to become poisoned or to form unwanted phosphate crystals, which may cause functional and/or aesthetic defects.

Referring again to FIG. 1A, an ion-exchangeable substrate 105 immersed in a salt bath 100 is schematically depicted. In FIG. 1A, the salt bath 100 is a molten salt bath comprising $KNO_3$ and $NaNO_3$, such as described above. The salt bath 100 has fresh molten salt 101 and includes larger alkali metal cations 120. The salt is considered to be "fresh" when the salt bath 100 has not been poisoned by smaller alkali metal cations, such as lithium cations 130, which may diffuse from the ion-exchangeable substrate 105 and into the salt bath 100 to poison the fresh molten salt 101. The larger alkali metal cations 120 may, in some embodiments, comprise potassium, sodium, or combinations thereof, which may have disassociated from the $KNO_3$ and $NaNO_3$ present in the salt bath 100.

In some embodiments, phosphate salts such as trisodium phosphate may be added to the salt bath 100 to precipitate out the excess lithium cations 130 as the lithium cations 130 exchange out of the ion-exchangeable substrate 105. The phosphate salt may be present in the salt bath 100 before the ion-exchangeable substrate 105 is contacted with the salt bath 100 or the phosphate salt may be added to the molten bath after at least one ion-exchangeable substrate 105 has contacted the molten salt bath 100, or, in some embodiments, both. The phosphate salt may precipitate the lithium cations 130 to prevent the fresh molten salt 101 from becoming poisoned by having too high of a lithium concentration. However, after precipitation of the lithium cations 130, the excess phosphate present in the salt bath 100 may form salt crystals, which may adhere to the surface of the ion-exchangeable substrate 105. The phosphate crystals may interact with the ion-exchangeable substrate 105, causing potassium cations, with may be preferably selected by the phosphate anions, to diffuse from the ion-exchangeable substrate 105, while the sodium cations diffuse into the ion-exchangeable substrate. The increased concentration of sodium cations in the ion-exchangeable substrate 105 may create a depression in the ion-exchangeable substrate 105 caused by the volumetric difference between sodium cations and potassium cations.

Without being bound by any particular theory, in some embodiments, surface defects, such as depressions and protrusions, may be caused by crystals bonding to the ion-exchangeable substrate 105 following an ion exchange treatment. These surface defects may be visually observable with or without the use of a magnifying lens (such as a microscope) or a green light inspection process. The crystals may bond to the ion-exchangeable substrate 105 and remain on the ion-exchangeable substrate 105 following removal from the salt bath 100. As the residual salt from the salt bath 100 cools on the ion-exchangeable substrate 105, larger alkali metal cations 120 present in the crystals may exchange with smaller alkali metals such as the lithium cations 130 present in the ion-exchangeable substrate 105. As the alkali metals exchange, localized stress may be formed in the ion-exchangeable substrate 105, creating a dimensional difference in the surface of the ion-exchangeable substrate 105. As the crystals are removed from the ion-exchangeable substrate 105 (such as by washing the ion-exchangeable substrate 105 with water), small depressions may remain in the surface of the ion-exchangeable substrate 105 caused by the exchange of cations from the crystal into the substrate. If the surface of the ion-exchangeable substrate 105 is thin, such as a thickness of less than or equal to 100 μm, when the crystals are removed from the ion-exchangeable substrate 105, the voids left by the larger alkali metal cations 120 may be forced through the surface of the ion-exchangeable substrate 105 to form protrusions on the an opposite surface of the ion-exchangeable substrate 105.

FIG. 1B schematically depicts a poisoned molten salt 102. A salt bath 100 is considered to have been "poisoned," when lithium cations 130 have diffused from the ion-exchangeable substrate 105 into the salt bath 100 such that the poisoned molten salt 102 contains an increased concentration of lithium cations 130. Having lithium cations 130 present in the salt bath 100 in a concentration greater than 2 wt % lowers the CS and DOL of the ion-exchangeable substrate 105 when compared to an ion-exchangeable substrate 105 in a salt bath 100 having a concentration of lithium cations of less than or equal to 2 wt %, such as fresh molten salt 101, as the increase of lithium cations 130 in the molten salt retards the ion exchange process. More particularly, a salt bath may become poised with lithium cations over time such that the ion exchange characteristics of the bath degrade over time and the strength characteristics (including CS and DOL) of the ion-exchangeable substrates treated in the salt bath vary, creating inconsistent product attributes over a manufacturing run.

Figure 2B:
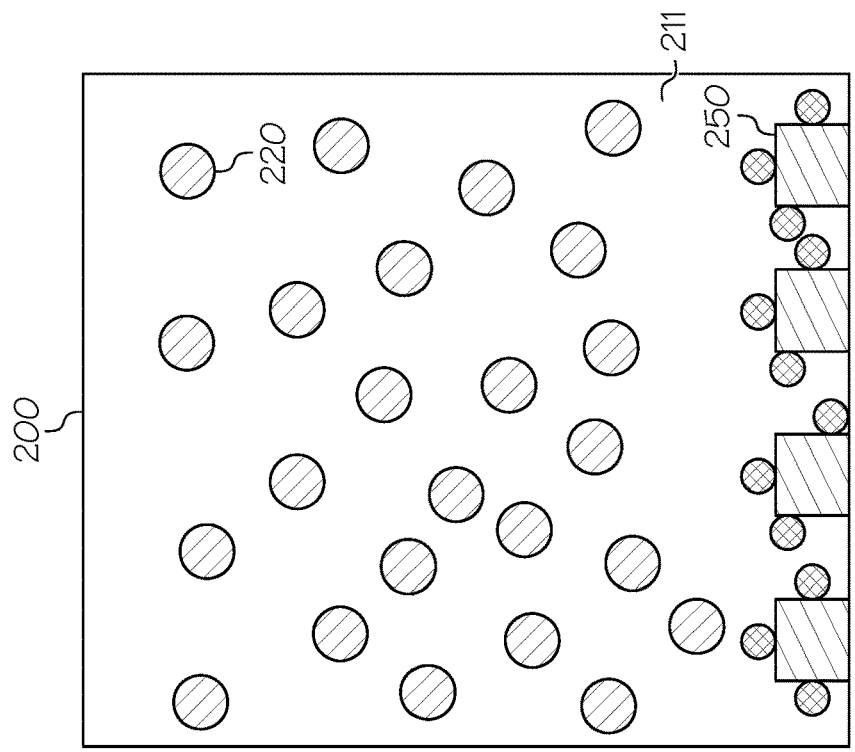
FIG. 2B schematically depicts a salt bath after regeneration of a lithium-poisoned salt bath according to embodiments disclosed and described herein.
Figure 2A:
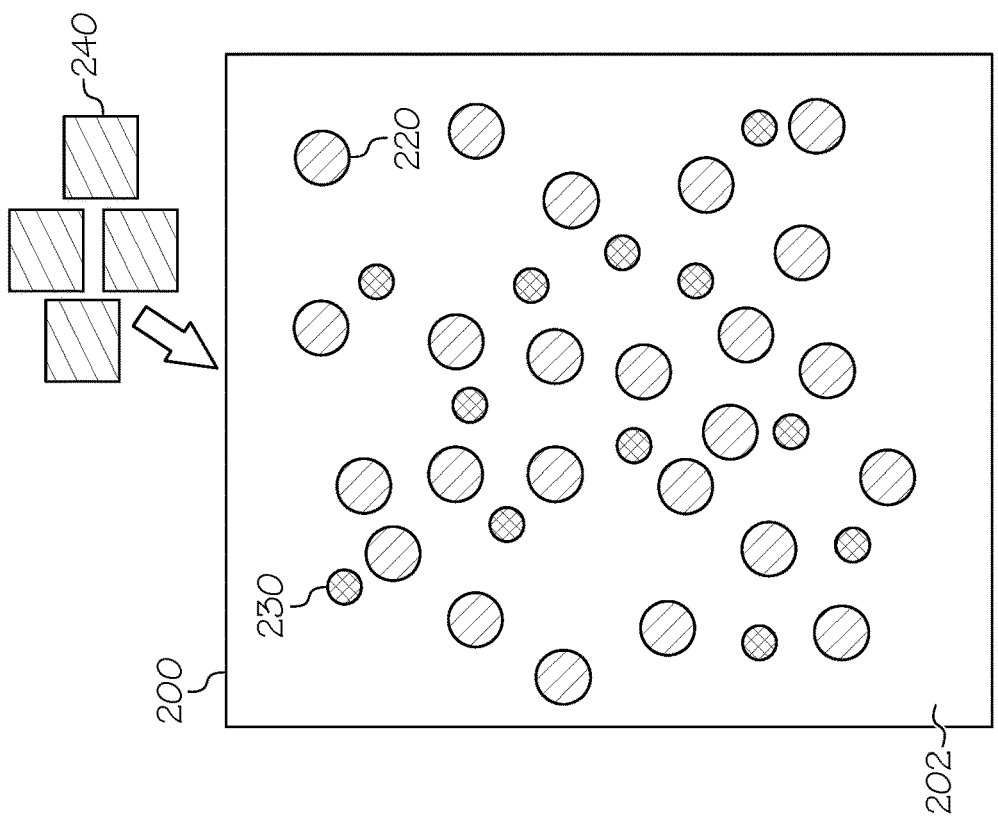
FIG. 2A schematically depicts a salt bath before regeneration of a lithium-poisoned salt bath.

Referring now to an embodiment shown in FIG. 2A, a salt bath 200 with poisoned molten salt 202 contains more than 2 wt % lithium cations 230 in the poisoned molten salt 202. The salt bath 200 contains metal cations 220 similar to the salt bath 100 and larger alkali metal cations 120, as described above with reference to FIGS. 1A and 1B. In FIG. 2A, a phosphate salt 240 is added to the salt bath 200 to regenerate the poisoned molten salt 202. As mentioned, the phosphate salt 240 may be added before or after the ion-exchangeable substrate 205 is contacted with the salt bath 200. The phosphate salt 240 comprises a cation and an anion that dissolves in the salt bath and disassociate to form $PO_4^{-3}$ anions and cations (including, but not limited to, sodium or potassium ions). The dissolved $PO_4^{-3}$ anions present in the salt bath 200 react with and selectively precipitate the dissolved lithium cations 230, favoring a reaction with the lithium cations 230 over other potential reactions, such as a reaction with sodium cations or potassium cations in the salt bath 200. The selective precipitation reaction produces insoluble $Li_3PO_4$ and $Li_2NaPO_4$ and $LiNa_2PO_4$, and generates additional cations (including, but not limited to, sodium and potassium cations) in the salt bath 200, which further aid in the ion exchange process between the ion-exchangeable substrate 205 and the salt bath 200.

To effectuate the selective precipitation of the lithium cations 230, in some embodiments, the phosphate salt 240 is added to the salt bath 200 so that the salt bath comprises greater than or equal to 0.10 wt % and less than or equal to 5.0 wt % of phosphate salt 240. In embodiments, the salt bath 100 may comprise from greater than or equal to 0.50 wt % to less than or equal to 5.0 wt %, from greater than or equal to 0.50 wt % to less than or equal to 1.0 wt %, or from greater than or equal to 0.10 wt % to less than or equal to 5.0 wt % of phosphate salt 240. In other embodiments, the salt bath 200 may comprise from greater than or equal to 0.10 wt % to less than or equal to 1.0 wt %, or from than or equal to 1.0 wt % to less than or equal to 5.0 wt % of phosphate salt 240.

In some embodiments, the phosphate salt 240 may comprise $Na_3PO_4$, $K_3PO_4$, $Na_2HPO_4$, $K_2HPO_4$, $Na_5P_3O_{10}$, $K_5P_3O_{10}$, $Na_2H_2P_2O_7$, $Na_4P_2O_7$, $K_4P_2O_7$$Na_3P_3O_9$, $K_3P_3O_9$, or combinations thereof. In some embodiments, the phosphate salt 240 may comprise $Na_3PO_4$, or may comprise $K_3PO_4$, or may comprise a combination of $Na_3PO_4$ and $K_3PO_4$. In some embodiments, the phosphate salt 240 may comprise anhydrous trisodium phosphate ($Na_3PO_4$), which may contain 10% or less water and may have a chemical purity of at least 97% or greater. Trisodium phosphate may be commercially available as trisodium orthophosphate, anhydrous from Shifang Zhixin Chemical Co. Ltd., based in China, or Prayon Inc., based in the United States (Augusta, Ga.). In some embodiments, the concentration of phosphate in the salt bath 200 may be greater than or equal to 50 parts per million (ppm) phosphate and less than or equal to 1,000 ppm phosphate. The concentration of phosphate in the salt bath 200 may be 500 ppm to 1,000 ppm phosphate or 250 ppm to 750 ppm phosphate.

FIG. 2B shows an embodiment of a salt bath 200 with regenerated molten salt 211. Particularly, the salt bath 200 has been regenerated by the addition of the phosphate salt 240 consequently precipitating lithium cations 230 out of the salt bath 200 in the form of insoluble lithium phosphate ($Li_3PO_4$) 250. Accordingly, the concentration of lithium cations 230 dissolved in the salt bath 200 is not greater than 2 wt % in the regenerated molten salt 211. That is, the phosphate salt 240 has selectively precipitated the lithium cations 230 to form insoluble lithium phosphate 250, reducing the lithium cations 230 dissolved in the salt bath 200 to less than 2 wt %. The dissociation of alkali metal cations (such as sodium or potassium) from the phosphate salt 240 in favor of the formation of lithium phosphate salt 250 also provides the salt bath 200 with more dissolved metal cations 220 that can later be exchanged into the ion-exchangeable substrate 205. Regenerated molten salt 211 is distinguished from the fresh molten salt 101 of FIG. 1A, in that fresh molten salt 101 does not have lithium cations 130 present in the salt bath 100, whereas regenerated molten salt 211 may have equal to or greater than 0 wt % but less than or equal 2.0 wt % lithium cations 230 present in the salt bath 200. The lithium cations 230 present in the salt bath 200 may react with the nitrate $NO_3^-$ anions present in the salt bath 200 to form lithium nitrate. In some embodiments, the concentration of lithium nitrate in the salt bath 200 may be greater than or equal to 0 wt % and less than or equal to 2 wt %. In some embodiments, the lithium nitrate concentration may be less than 1.5 wt % or less than 1 wt %, such as from greater than or equal to 0 wt % and less than or equal to 1.5 wt % or less than or equal to 1 wt % in the salt bath 200. In some embodiments, the lithium nitrate concentration in the salt bath 100 may be greater than or equal to 0 wt % to less than or equal to 0.5 wt %, greater than or equal to 0 wt % to less than or equal to 0.1 wt %, or greater than or equal to 0 wt % to less than or equal to 0.05 wt %. Alternatively, the lithium nitrate concentration in the salt bath 200 may be from greater than or equal to 0.5 wt % to less than or equal to 2 wt %, or from greater than or equal to 0.1 wt % to less than or equal to 1.5 wt %.

In some embodiments, the phosphate salt 240 may be added to the salt bath 200 such that the concentration of phosphate salt 240 is less than or equal to the concentration of the lithium cations 130 present in the salt bath 200. Without being bound by any particular theory, excess phosphate salts 240 may, in some embodiments, generate crystals on the surface of the ion-exchangeable substrate 105. These crystals may propagate defects on the surface of the ion-exchangeable substrate 105, which may not be desirable. By maintaining a concentration of phosphate salt 240 that is equal to or less than the concentration of the lithium cations 130, the generation of surface defects may be reduced or prevented. This will be discussed further below with specific reference to FIGS. 4 to 6.

In embodiments, the salt bath 200 may be used for at least 300 hours before the regenerated molten salt 211 needs to be changed. In other embodiments, the salt bath 200 may be used for at least 100 hours, 150 hours, 175 hours, 200 hours, 250 hours, or 400 hours before the regenerated molten salt 211 needs to be changed.

As shown in the embodiments depicted by FIGS. 2A and 2B, the phosphate salt 240 may be added to "spike" the salt bath 200 without the ion-exchangeable substrate 205 present in the bath. For example, in embodiments, a poisoned salt bath may be spiked between ion exchange cycles. "Spiking" the salt bath 200 refers to adding phosphate salt to a poisoned salt bath. In embodiments, the phosphate salt 240 may be added in amounts from greater than or equal to 0.10 wt % to less than or equal to 10.0 wt %. In some embodiments, the salt bath 200 may be spiked before the ion-exchangeable substrate 250 is contacted with the salt bath 200, or after the ion-exchangeable substrate is contacted with the salt bath 200, or both. For instance, in some embodiments, a salt bath 200 comprising at least one of $KNO_3$ and $NaNO_3$ is heated and contacted with an ion-exchangeable substrate 205. The compressive stress of the first ion-exchangeable substrate 205 may be measured thought any techniques known in the industry. As the ion exchange process proceeds, the lithium cations 130 may begin to diffuse from the ion-exchangeable substrate 205, poisoning the salt bath 200. As the salt bath 200 becomes increasingly poisoned with the lithium cations 130, the compressive stress of subsequent ion-exchangeable substrates 205 produced by contacting the substrate with the poisoned bath may begin to decrease as compared to the compressive stress of ion-exchangeable substrates produced by contacting the substrates with the non-poisoned bath. Once subsequently treated ion-exchangeable substrates 205 produced by contacting the substrate with the poisoned salt bath 200 have a compressive stress below a certain value relative to the ion-exchangeable substrates treated by contacting with a non-poisoned bath, phosphate salt 240 may be added to the bath. In some embodiments, the ion-exchangeable substrates 205 are removed from the salt bath 200, the salt bath 200 may be spiked with phosphate salts 240 to mitigate the poisoning lithium cations 130 by selectively precipitating the lithium in the bath into sludge, which may then be removed from the bath.

In some embodiments, the at least one ion-exchangeable substrate 205 may be removed from the salt bath 200 when the compressive stress of the subsequent ion-exchangeable substrate 205 produced by contacting the substrate to the poisoned salt bath is measured to be from 40 to 70 MPa below the compressive stress of the first ion-exchangeable substrate 205 initially produced by contacting the substrate with the non-poisoned salt bath 200 before the lithium poisoning. In some embodiments, the phosphate salt may be added to the bath when the compressive stress of subsequent ion-exchangeable substrates measures to be 50 to 70 MPa below the compressive stress of the ion-exchangeable substrates 205 initially produced by non-poisoned salt baths 200, or from 50 to 60 MPa, or from 40 to 60 MPa below the compressive stress of the ion-exchangeable substrates 205 initially produced by non-poisoned salt baths 200. Similarly, if the salt bath 200 initially contained phosphate salt 240 before the ion-exchangeable substrate 205 was contacted with the salt bath 200, a second phosphate salt may be added to the salt bath when the compressive stress of the ion-exchangeable substrate 205 being treated in the salt bath 200 containing diffused lithium cations 130 is from 40 to 70 MPa less than a compressive stress of a substrate treated in a salt bath that does not contain diffused lithium cations. In some embodiments, the phosphate salt may be added when the compressive stress is 50 to 70 MPa below the compressive stress of the ion-exchangeable substrates 205 initially produced by non-poisoned salt baths 200, or from 50 to 60 MPa, or from 40 to 60 MPa below the compressive stress of the ion-exchangeable substrates 205 initially produced by non-poisoned salt baths 200. In such embodiments, the second phosphate salt may have the same composition or a different composition as the phosphate salt initially contained in the salt bath.

In some embodiments, the phosphate salt 240 may be added to the salt bath 200 when the CS of the ion-exchangeable substrate 205 treated in the poisoned salt bath 200 containing diffused lithium cations 130 (hereinafter referred to as "second CS") is from 10 MPa to 70 MPa below the CS of a similar ion-exchanged substrate in the non-poisoned salt bath 200 before the diffusion of lithium cations 130 (hereinafter referred to as "second CS"). Lithium cations 130 may be selectively precipitated from the salt bath 200 when the ion-exchangeable substrate 205 has a compressive stress of from 10 MPa to 70 MPa less than the compressive stress of a similar ion-exchangeable substrate 205 treated in a salt bath 200 that does not contain diffused lithium cations. To precipitate the lithium cations 130, phosphate salt 240 may be added to the salt bath 200 when the average second CS is approximately 50 to 60 MPa, or 30 to 40 MPa, or 45 to 55 MPa below the first CS of the ion-exchangeable substrate 205. In other embodiments, the phosphate salt 240 may be added when the average second CS is approximately 20 to 30 MPa, or 30 to 50 MPa, or 40 to 45 MPa, or 45 to 50 MPa below the first CS.

In some embodiments, phosphate salt 240, such as TSP, may be added to the salt bath 200 until the second CS is within 10 to 20 MPa of the first CS of the non-poisoned ion-exchangeable substrate 205. Without being bound by any particular theory, by not adding enough TSP to bring the CS back to the original level in the non-poisoned ion-exchangeable substrate 205 may aid in reducing or preventing the formation of phosphate crystals 247. In some embodiments, phosphate salts 240 may be added until the second CS is within 15 to 25 MPa of the original CS of the ion-exchangeable substrate 205, or until the CS is within 5 to 10 MPa, or within 15 to 20 MPa, or within 10 to 15 MPa, or within 15 to 25 MPa of the first CS of the non-poisoned ion-exchangeable substrate 205. In some embodiments, phosphate salt 240 may be added to the salt bath 200 to maintain a CS of from 10 to 50 MPa below the first CS of the ion-exchangeable substrate 205. In some embodiments, phosphate salt 240 may be added to the salt bath 100 to maintain a second CS of from 10 to 40 MPa, or 20 to 50 MPa, or 20 to 40 MPa, or 15 to 45 MPa, or 5 to 40 MPa below the first CS of the non-poisoned ion-exchangeable substrate 205.

The amount of phosphate salts 240 added to the salt bath 100 may depend on a variety of factors, including the ion-exchangeable substrate 105 and the size of the salt bath 100. In some embodiments, adding 0.5 wt % TSP may equate to a CS recovery of approximately 30 MPa. Therefore, in some embodiments, for a salt bath 100 that holds approximately 1400 kg of salt, 0.5 wt % of 1400 kg would be equivalent to 7 kg of TSP needed to recover the CS of the ion-exchangeable substrate 105 by an increase in CS of about 30 MPa. [INVENTORS: DO YOU HAVE ANY OTHER EXAMPLES?]

In some embodiments, before, during, and/or after the addition of phosphate salt 240, the salt bath 100 may be inspected for visual quality. If the salt bath 200 is still cloudy, such as from the addition of phosphate salt 240, it may stain the ion-exchangeable substrate 205 and may, in some embodiments, create a haze on the ion-exchangeable substrate 205. Hazy or stained ion-exchangeable substrates 205 may not be suitable for use in particular industrial applications. In some embodiments, the salt bath 200 may be inspected for visual quality before the ion-exchanged substrate 205 is contacted with the salt bath 200 to prevent haze and/or staining.

In some embodiments, the phosphate salt 240 may be added to the salt bath 200 in a substantially solid phase before the ion-exchangeable substrate 205 is added to the salt bath 200. For instance, the phosphate salt 240 may be added to the salt bath 200 as a powder, a pellet, a capsule, or in granular form. In some embodiments, the phosphate salt 240 may be added to the salt bath 200 as a powder to promptly regenerate the salt bath 200 due to the high surface-to-volume ratio of powders. In other embodiments, the phosphate salt 240 may be added to the salt bath 200 in a capsule form to promptly sink to the bottom of the salt bath 200. The advantages and disadvantages of adding the phosphate salt 240 in a powdered, pellet, and capsule form will be discussed further below with reference to FIGS. 7 and 16.

After the phosphate salt 240 is added to the salt bath 200, the phosphate salt 240 may settle in the salt bath 200. Some phosphate salt 240 may substantially dissolve to a liquid phase in the salt bath 200, which may allow for stratification to occur between the lithium cations 230 and the liquefied phosphate salt 240. In some embodiments, the salt bath 200 may comprise both liquid phosphate salt 240 which may disassociate into $PO_4^{-3}$ anions and cations, and solid phosphate salt 240, which may be allowed to settle into the bottom of the salt bath 200 before the ion-exchangeable substrate 205 is contacted with the salt bath 200, so as to prevent defects from forming in the ion-exchangeable substrate 205. In some embodiments, the disassociated phosphate salt 240 may stratify and selectively precipitate the lithium cations 230. In embodiments, as lithium phosphate 250 is selectively precipitated from the salt bath 200, the phosphate salt 240 may transition from a substantially solid phase at the bottom of the salt bath 200 to a substantially liquid phase, disassociating into $PO_4^{-3}$ anions and cations to allow for further selective precipitation with the lithium cations 230. Thus, it should be understood that the liquid phase of the phosphate salt 240 may react with the lithium cations 230 in a liquid phase to form insoluble (i.e., solid) lithium phosphate 250 which may precipitate from the salt bath 200.

Some embodiments further comprise forming insoluble lithium phosphate 250 from the selective precipitation reaction, as discussed above, and removing the insoluble lithium phosphate 250 from the salt bath 200. In some embodiments, the lithium phosphates 250 may settle to the bottom of the salt bath 200, where the lithium phosphate 250 may be cleared or removed with a filter, or a sieve or strainer, or removed through other means. Alternatively, the insoluble lithium phosphate 250 may remain in the bottom of the salt bath 200.

Figure 3B:
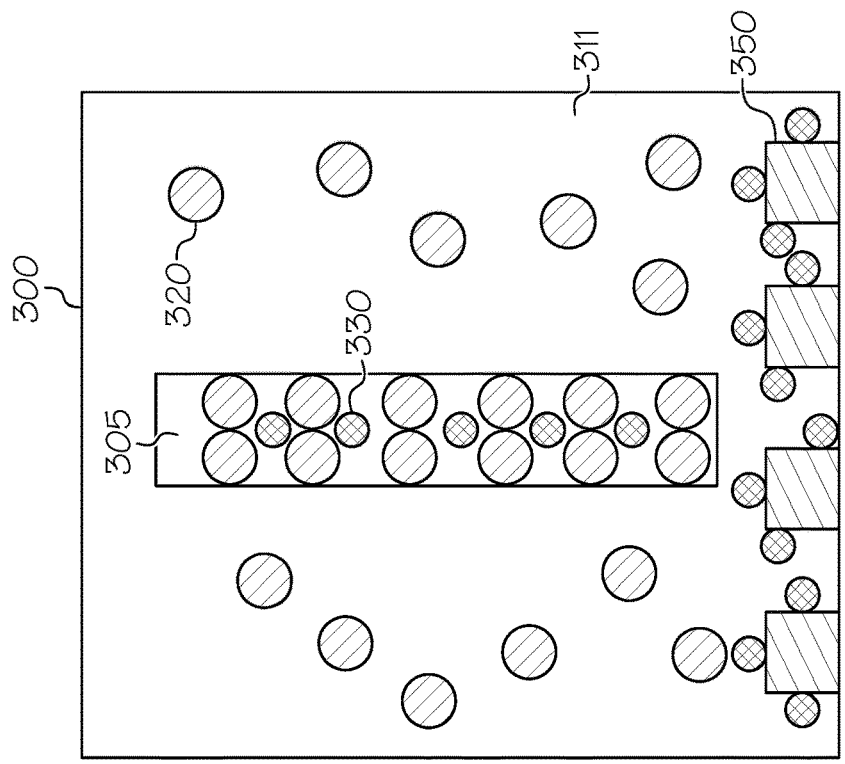
FIG. 3B schematically depicts a salt bath during regeneration according to embodiments disclosed and described herein.
Figure 3A:
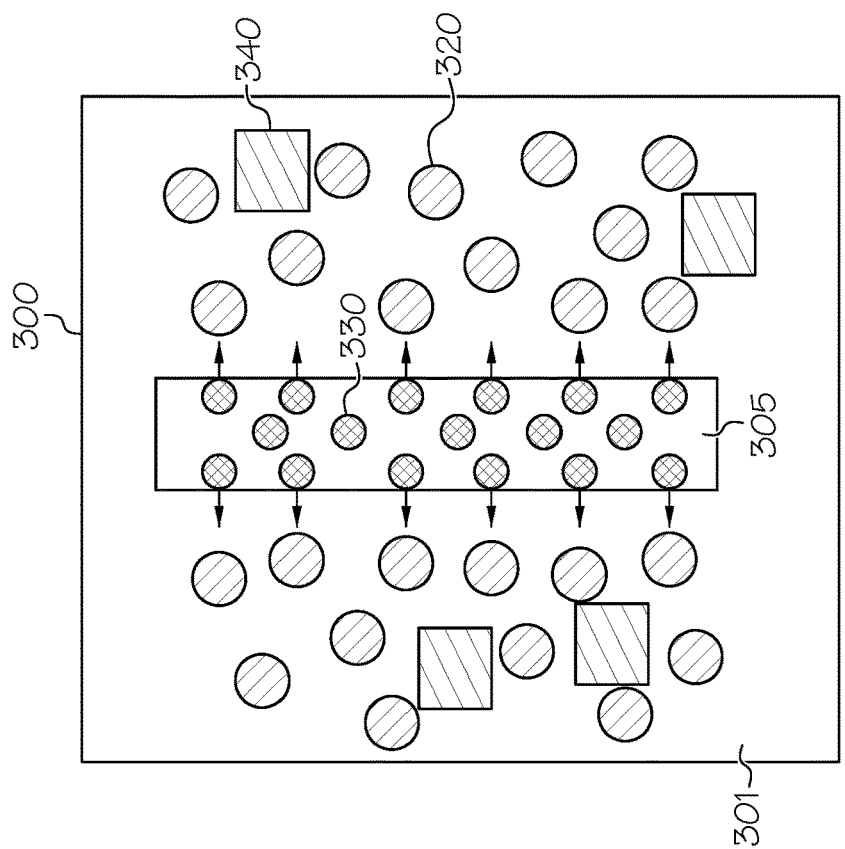
FIG. 3A schematically depicts a salt bath during regeneration according to embodiments disclosed and described herein.

Referring now to FIGS. 3A and 3B, a salt bath 300 is schematically depicted during regeneration. FIG. 3A depicts a salt bath 300 with fresh molten salt 301 that comprises phosphate salt 340 in addition to the at least one of $KNO_3$ and $NaNO_3$. The ion-exchangeable substrate 305 contains lithium cations 330 which will diffuse out of the ion-exchangeable substrate 305 and into the salt bath 300. As shown in FIG. 3B, due to the phosphate salts 340 present in the fresh molten salt 301, as the lithium cations 330 diffuse from the ion-exchangeable substrate 305, the lithium cations 330 will be selectively precipitated by the phosphate salt 340 to form insoluble lithium phosphate 350, which sinks to the bottom of the salt bath 300. The phosphate salt 340 selectively precipitates the lithium cations 330 to a concentration of less than 2 wt % in the salt bath 300, and the fresh molten salt 301 of FIG. 3A becomes regenerated molten salt 311 as the lithium cation 330 concentration is greater than or equal to 0 wt % and less than or equal to 2 wt % lithium cations 330.

As shown in FIGS. 3A and 3B, in some embodiments the salt bath 300 does not need to be spiked, as discussed above. In some embodiments, the phosphate salt 340 may be added to the salt bath 300 to form lithium phosphate 350 as the lithium cation 330 concentration increases during the ion exchange process. This allows for the ion exchange process to occur at a faster rate. Furthermore, it allows for the regenerated molten salt 311 to be changed less frequently.

Figure 4:
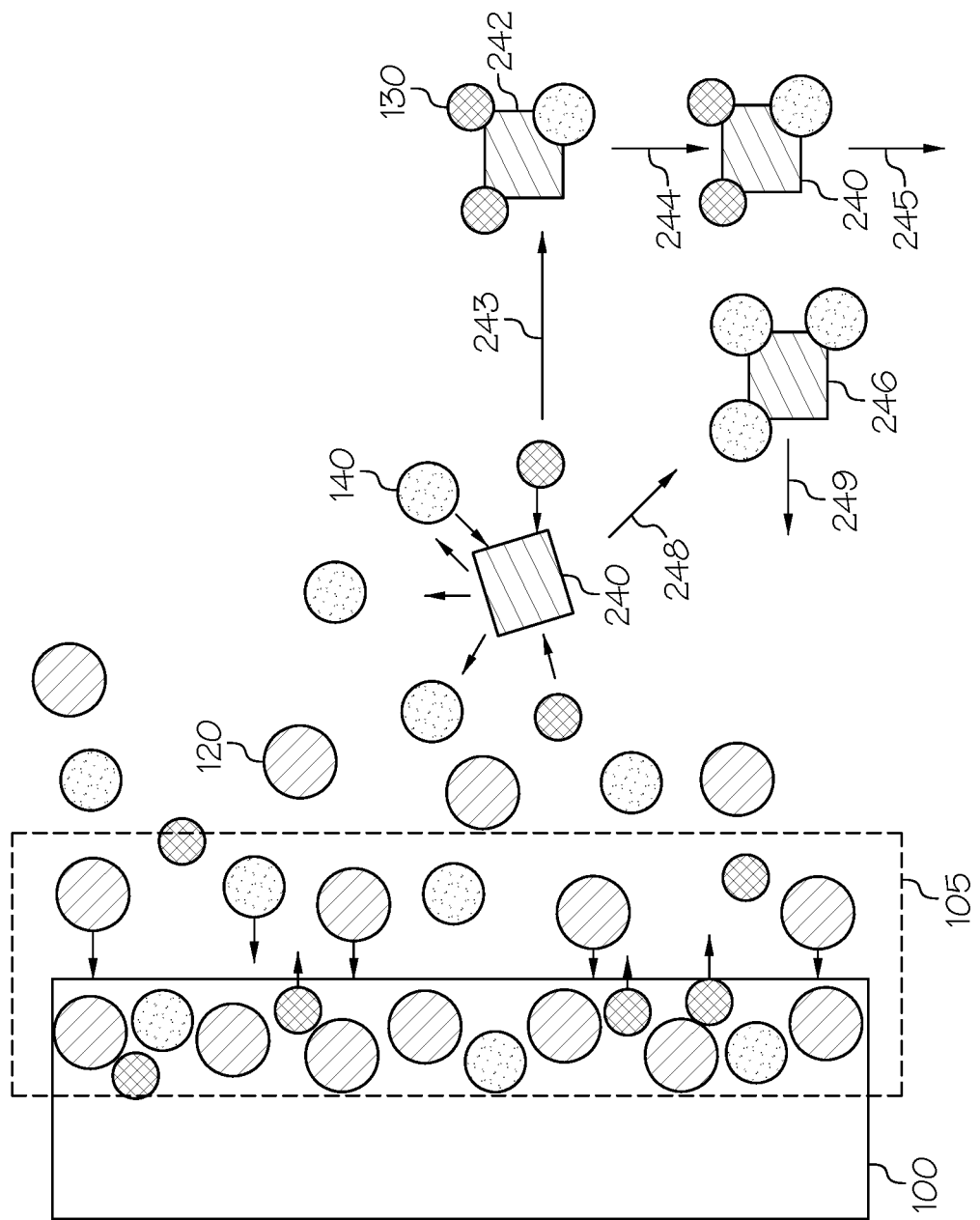
FIG. 4 schematically depicts an ion-exchangeable substrate during salt bath regeneration according to embodiments disclosed and described herein.

Referring now to FIG. 4, a schematic view of an ion-exchangeable substrate 105 in a salt bath 100 is depicted. As phosphate salt 240 is added to the salt bath 100, the lithium cations 130 present in the salt bath 100 are selectively precipitated to form lithium phosphates 250. In some embodiments, the lithium phosphates 250 may be a mixed lithium phosphate 242, such as lithium sodium phosphate, $Li_2NaPO_4$ or $LiNa_2PO_4$, or combinations thereof. Lithium cations 130 preferably bond with the phosphate salt 240 over other alkali metal cations present in the salt bath (such as the metal cations 220). However, as the lithium cation 130 concentration diminishes in the bath, the phosphate salt 240 may begin to react with other alkali metal cations present in the salt bath, such as medium alkali metal cations 140. The medium alkali metal cations 140 may, in some embodiments, be larger than the lithium cations 130 but smaller than the larger alkali metal cations 120. The medium alkali metal cations 140 may be $Na^+$, $K^+$, or other alkali metals such as $Rb^+$, $Cs^+$, or $Fr^+$.

Without being bound by any particular theory, as the lithium cations 130 are precipitated out of the salt bath 100, the remaining phosphate salt 240 present in the salt bath 100 may be attracted to the medium alkali metal cations 140 to form phosphate alkali salts 246. The phosphate alkali salts 246 may comprise trisodium phosphate ("TSP," $Na_3PO_4$) or tripotassium phosphate ($K_3PO_4$). The phosphate alkali salts 246 may be the same or may be a different composition than the originally added phosphate salts 240. In some embodiments, the phosphate alkali salts 246 may not precipitate to the bottom of the salt bath 100 as lithium phosphates 250 and phosphate alkali salts 246. Rather, in some embodiments, the phosphate alkali salts 246 may instead remain in the salt bath 100.

Figure 5B:
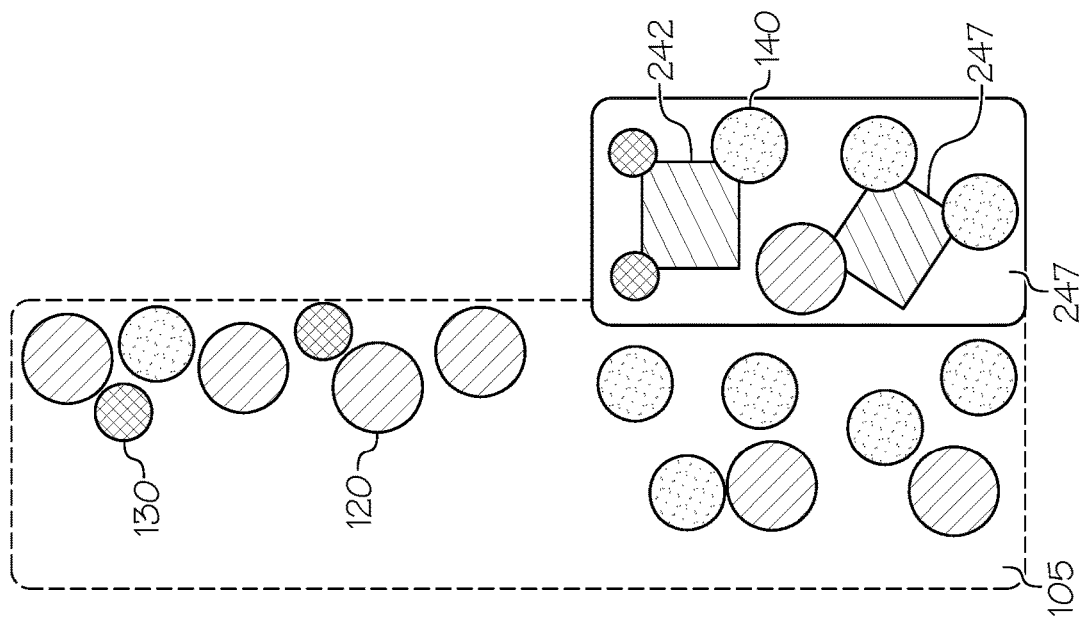
FIG. 5B schematically depicts a reaction occurring between a phosphate crystal and an ion-exchangeable substrate.
Figure 5A:
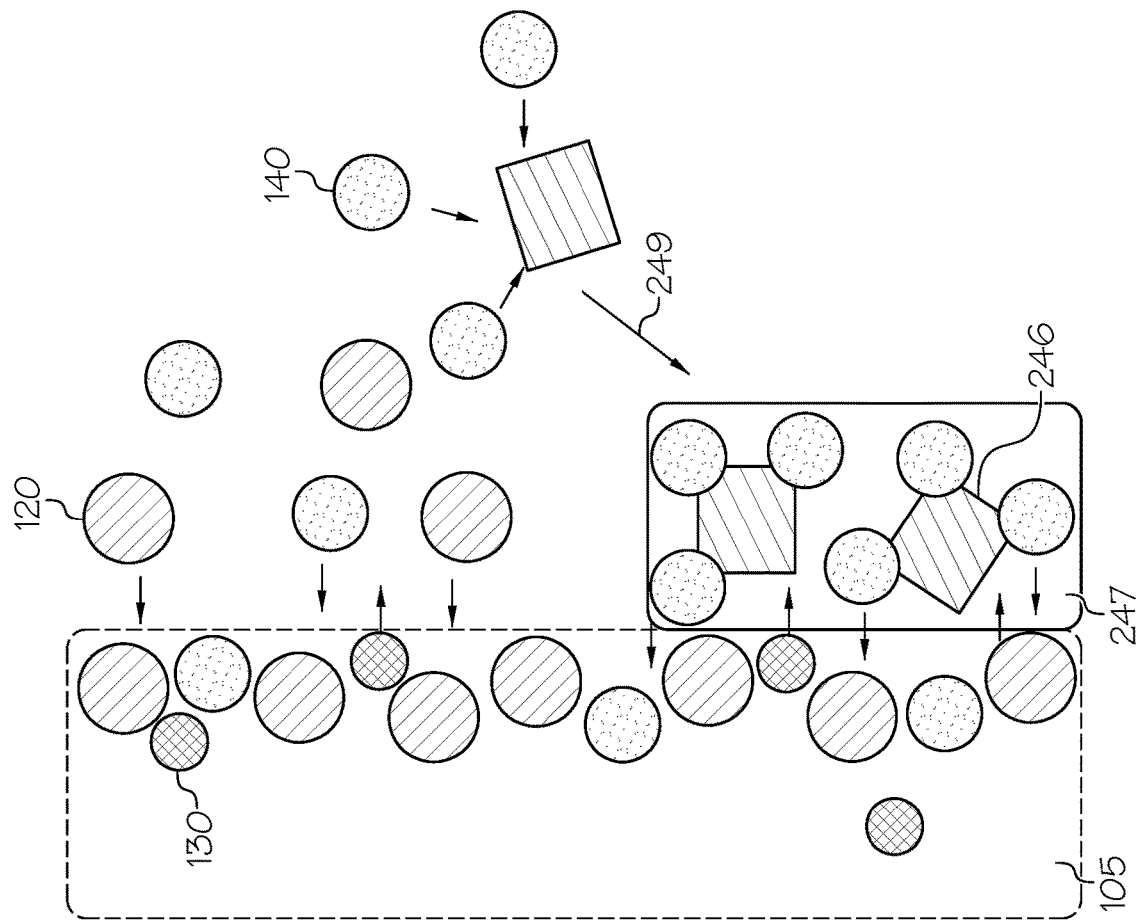
FIG. 5A schematically depicts an ion-exchangeable substrate in which a phosphate crystal has formed on the surface.

Referring now to FIG. 5A, in some embodiments, the phosphate alkali salts 246 form phosphate crystals 247, which may attach to the surface of the ion-exchangeable substrate 105, as depicted by arrow 249. The phosphate crystals 247 may accumulate to form "sludge" in the salt bath 100. The sludge may be a liquid slurry comprising phosphate crystals 247 and other bath contaminants. The salt may be periodically analyzed to determine the amount and content of the sludge in the salt bath 100. In some embodiments, the sludge may be physically or chemically removed from the salt bath 100. For instance, the sludge may be physically skimmed out of the bath, or the sludge may be filtered from the bath. The formation of sludge may, in some embodiments, be proportional to the amount of phosphate salt 240 added to the salt bath 200. For instance, in some embodiments, 1 kg of TSP may produce about 0.8 kg of sludge. This weight discrepancy may be due to the exchange of sodium in the TSP for lithium cations 130 which may precipitate to form $Li_2NaPO_4$, $LiNa_2PO_4$ $Li_3PO_4$, of combinations thereof. In some embodiments, the rate at which phosphate salt 240 is added to the salt bath 200 may be proportional to the rate at which sludge may be removed from the salt bath 200.

Upon removal of the sludge, it may be necessary to add additional salt to the salt bath 100 to maintain the proper salt ratio in the bath. In some embodiments, salt may be added to restore the ratio of the salts in the salt bath 100 to the original salt ratio. For instance, if the salt bath originally contained 49 mol % $NaNO_3$ and 51 mol % $KNO_3$, and upon removal of sludge some salt was lost from the bath such that the ratio of salt was now 43 mol % $NaNO_3$ and 57 mol % $KNO_3$, $NaNO_3$ may be added to the salt bath to raise the content of $NaNO_3$ by 6 mol %. This may prevent the salt concentration from impacting the ion exchange process of the ion-exchangeable substrate 205, which may cause unwanted changes in the properties of the substrate.

Still referring to FIG. 5A, the medium alkali metal cations 140 (such as sodium cations) present in the phosphate alkali salts 246 may begin to undergo an ion-exchange process with the ion-exchangeable substrate 105 with the larger alkali metal cations 120 (such as potassium cations) and any remaining lithium cations 130 present in the ion-exchangeable substrate 105. The medium alkali metal cations 140 in the phosphate crystals 247 may exchange into the surface of the substrate, while the larger alkali metal cations 120 and any remaining lithium cations 130 may exchange out of the substrate and into the phosphate crystals 247. While the lithium cations 130 may form insoluble lithium phosphate, $Li_3PO_4$, or insoluble lithium sodium phosphate, $Li_2NaPO_4$, or insoluble lithium disodium phosphate, $LiNa_2PO_4$, and precipitate, the large alkali metal cations 120 may form phosphate salts, (such as tripotassium phosphate, $K_3PO_4$) which remain as a phosphate crystal 247.

In FIG. 5B, once the ion-exchangeable substrate 105 is removed from the salt bath 100, the crystals are removed from the ion-exchangeable substrate 105, depicted by arrow 280. The crystals may be removed 280 by washing the ion-exchangeable substrate 105 with water, such as deionized water, or by any known suitable method. The phosphate crystals 247 may now contain the larger alkali metal cations 120 and lithium cations 130 bonded with the phosphate salts 240 to produce, for instance, lithium sodium phosphate $Li_2NaPO_4$ or lithium disodium phosphate $LiNa_2PO_4$ or potassium sodium phosphate $K_2NaPO_4$ in the phosphate crystals 247. As the phosphate crystals 247 are removed, the ion-exchangeable substrate 105 may be left with a surface depression where the phosphate crystals 247 previously resided on the ion-exchangeable substrate 105.

As discussed previously, as the alkali metals exchange between the ion-exchangeable substrate 105 and the phosphate crystals 247, the difference in volumetric size between the larger alkali metal cations 120, the medium alkali metal cations 140, and the lithium cations 130 may generate localized stress in the ion-exchangeable substrate 105. The localized stress may create a dimensional difference in the surface of the ion-exchangeable substrate 105 and may form a surface defect by leaving depression from the volumetric void previously occupied by the larger sized cation. Ideally, ion-exchange process generates a uniform compressive layer of stress in the ion-exchangeable substrate 105 without regions of localized, highly concentrated areas of stress. Highly concentrated localized regions of stress may generate defects in the ion-exchangeable substrate 105, including depressions and protrusions in the surface of the ion-exchangeable substrate 105.

Figure 6:
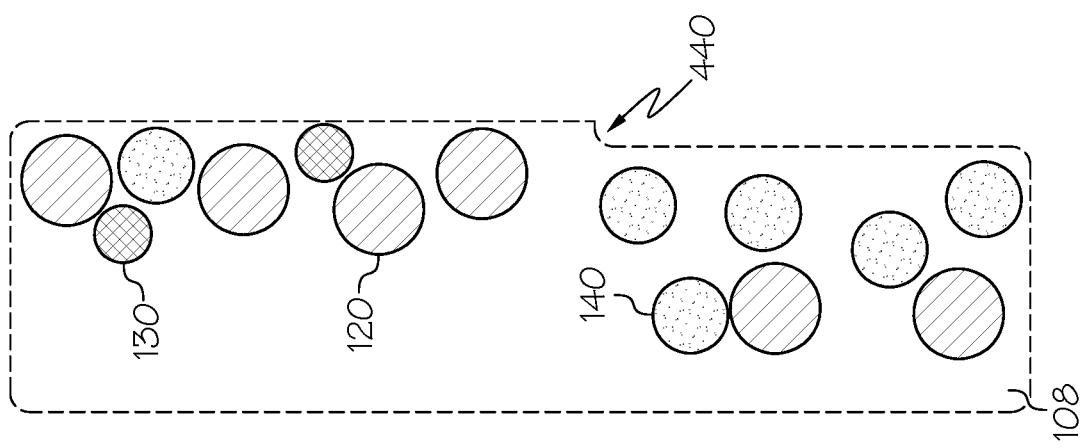
FIG. 6 schematically depicts an ion-exchangeable substrate comprising a surface defect.

As shown in FIG. 6, the removal of the phosphate crystals 247 may reveal surface defects 440 on the surface of the ion-exchangeable substrate 105, to form a defective ion-exchanged substrate 108, which may not be desirable. Without being bound by any particular theory, in the surface of the ion-exchangeable substrate 105, the void from the larger alkali metals (such as the larger alkali metal cations 120) may not be filled completely by the smaller alkali metals (such as the medium alkali metal cations 140), and as the phosphate crystals 247 are removed from the ion-exchangeable substrate 105 small depressions in the surface of the defective ion-exchanged substrate 108 may be formed. In some embodiments, a depression generated in one surface of a substrate may produce a protrusion on an opposite surface of the substrate. This may particularly occur in thin substrates, such as substrates having a thickness of less than or equal to 100 µm, or less than or equal to 150 µm, or less than or equal to 75 µm, or less than or equal to 50 µm.

In some embodiments, the surface defect 440 may be a depression or a protrusion having a height or depth of greater than or equal to at least 1.2 nm and a width or length of greater than or equal to at least 0.005 mm. The surface defect 440 may have a height or depth of from 1 nm to 200 nm, or from 1 nm to 100 nm, or from 1 nm to 10 nm. In some embodiments, the surface defect 440 may have a height or depth of from 10 nm to 50 nm, or from 100 nm to 50 nm, or from 100 nm to 200 nm. The surface defect 440 may have a width or length of from 0.1 μm to 5 μm, or from 0.1 μm to 50 μm, or from 0.1 μm to 0.5 mm. In some embodiments, the surface defect 440 may have a width or length of from 0.1 to 0.5 mm, or from 0.05 to 0.1 mm, or from 0.05 to 0.5 mm, or from 0.001 to 0.5 mm. In some embodiments, the surface defects 440 may be visible to the unassisted eye. In other embodiments, the surface defects 440 may only be visible when placed under a green light or using a microscope or another magnifying lens.

Various strategies may be employed to prevent or reduce the formation of the surface defects 440, the phosphate crystals 247, or both. In some embodiments, as previously mentioned, it may be desirable to limit the concentration of phosphate salts 240 added to the salt bath 100 such that the concentration of lithium cations 130 is greater than or equal to the concentration of the phosphate salt 240 present in the salt bath 100. As the phosphate salt 240 will preferably attract lithium cations 130, which may precipitate out of the bath as solid lithium phosphates 250, by limiting the concentration of phosphate salt 240 present in the bath to less than or the same as the concentration of the lithium cations 130, the phosphate crystals 247 may not form, thereby preventing the surface defects 440. While a minority of phosphate salt 240 may still react with the larger alkali metal cations 120 and the medium alkali metal cations 140 to form phosphate crystals 247, the reduced amount of phosphate crystals may be easily washed from the ion-exchangeable substrate 105 without causing visible, or in some embodiments, any surface defects 440.

Another embodiment for reducing or preventing phosphate crystals 247, surface defects 440, or both, includes reducing the amount of time in which the ion-exchangeable substrate 105 is in contact with the phosphate salt 240. For instance, the formation of phosphate crystals 247, surface defects 440, or both, may be reduced or removed by limiting the amount of time in which the ion-exchangeable substrate 105 is present in the salt bath 100. This may prevent the formation of the phosphate crystals 247 in the salt bath 100, or may reduce the concentration of the phosphate crystals 247 in the salt bath 100, both of which may reduce the likelihood of the phosphate crystals 247 attaching on the surface of the ion-exchangeable substrate 105.

Likewise, the formation of phosphate crystals 247, surface defects 440, or both, may be reduced or removed by quickly cooling the ion-exchangeable substrate 105 upon removal from the salt bath 100. In some embodiments, the ion-exchangeable substrate 105 may be cooled from the temperature of the salt bath 100 to a temperature of less than or equal to 100° C. in less than 5 minutes. In some embodiments, the ion-exchangeable substrate 105 may be cooled to a temperature of less than or equal to 100° C. in less than 3 minutes, or less than 2 minutes, or less than 1 minute, or less than 1 minute and 30 seconds, or less than 30 seconds, or less than 10 seconds. Without intent to be bound by any particular theory, if the ion-exchangeable substrate 105 is cooled down to a temperature of less than or equal to 100° C. in greater than 5 minutes, the phosphate crystals 247 may be able to coalesce or otherwise grow larger in size, which may propagate more surface defects 440, more visible surface defects 440, or both. In some embodiments, the ion-exchangeable substrate 105 may be cooled from a temperature of greater than or equal to 380° C. to a temperature of less than or equal to 100° C. in from 30 seconds to 3 minutes, or from 30 seconds to 1 minute and 30 seconds. In some embodiments, the ion-exchangeable substrate 105 may be cooled to a temperature of less than or equal to 100° C. in from 1 minute to 3 minutes, or from 1 minute and 30 seconds to 3 minutes, or from 45 seconds to 2 minutes or from 2 minutes to 3 minutes.

Additionally, phosphate crystals 247 have a propensity to crystallize at low temperatures due to their low solubility. In some embodiments, the formation of phosphate crystals 247, surface defects 440, or both may be reduced or prevented by utilizing a salt bath 100 with a temperature of at least 380° C., such as at least 400° C., 420° C., or 450° C. The temperature of the salt bath 100 may be dependent on the composition of the ion-exchangeable substrate 105.

Figure 7:
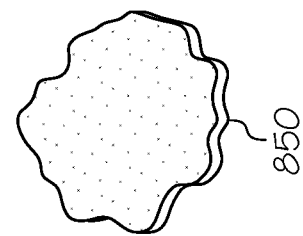
FIG. 7 schematically depicts a power, a pellet, and a capsule of phosphate salt according to embodiments disclosed and described herein.
Figure 7:
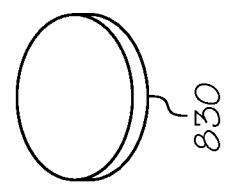
Figure 7:
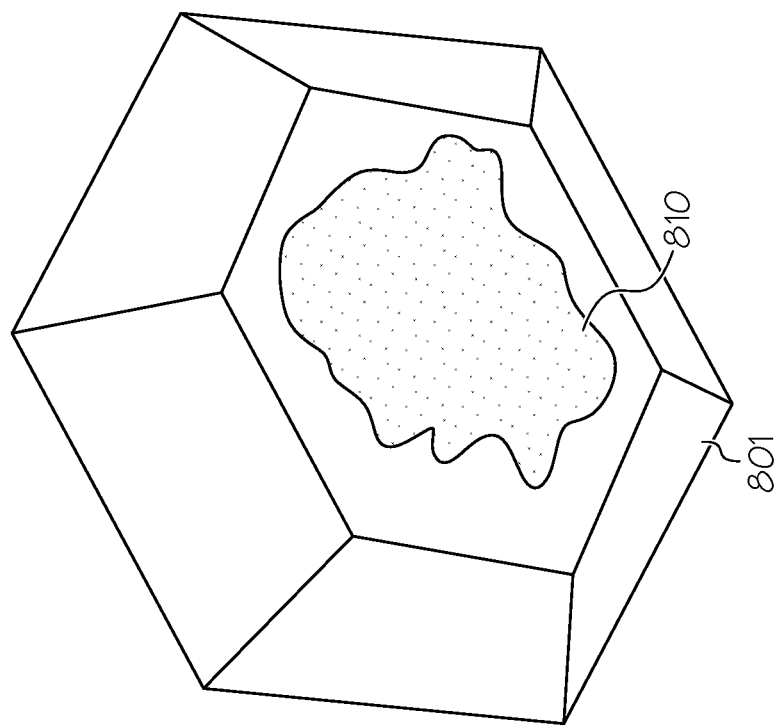

As previously mentioned, the method of introducing the phosphate salt 240 to the salt bath 100 may affect the reactions between the lithium cations 130 and the phosphate salt 240, thus impacting the formation of the phosphate crystals 247 or lack thereof. As shown in FIG. 7, the phosphate salt 240 may be added to the salt bath 100 as a powder 810, as a pellet 830, or as a capsule 850. As used here, a "powder" refers to fine dry particles produced by the grinding, crushing, or disintegration of a solid substance. As used herein, a "pellet" refers to a compressed shaped mass of a powder. As used herein, a "capsule" refers to a substance, such as a powder, that is substantially enclosed and enveloped by a sheath or membrane.

Conventionally, powdered substances may be preferred due to the high surface-to-volume ratio that allows a powder 810 to react quickly and efficiently with the other reactants, such as the lithium cations 130. However, adding powder 810 to the salt bath 100 may result in a cloudy bath in which the powder has stratified due to the small individual particles, as powder may have a tendency to create dust during dispensing that must be managed during application. In some embodiments, a salt bath 100 that is cloudy may not be suitable for an ion exchange process, as it may impart various defects in the ion-exchangeable substrate 105. The salt bath 100 may remain cloudy for a long period of time, such as 6 hours, 8 hours, 10 hours, one day or three days or more, prolonging the process and increasing the time and cost required to process the ion-exchangeable substrate 105. Conventionally, for these reasons, a pellet 830 may be preferably used, as a pellet 830 may sink to the bottom of the salt bath 100 without stratifying and producing cloudiness in the salt bath 100. However, a pellet 830 may not react as quickly with the lithium cations 130 due to the decreased surface area of the pellet when compared to the powder 810.

Therefore, in some embodiments, a capsule 850 may be used to introduce the phosphate salt 240 to the salt bath 100. In some embodiments, the capsule 850 may be comprised of powdered phosphate salts 240 encapsulated with a salt mixture. In some embodiments, the salt mixture may comprise $NaNO_3$, $KNO_3$, or both. Upon introduction to the salt bath 100, the capsule 850 may sink to the bottom of the salt bath 100 where the encapsulated salt may dissolve, releasing the inner powdered phosphate salt 240 to quickly react with the lithium cations 130 without stratifying and causing a cloudy salt bath 100.

To prepare a capsule 850, in some embodiments, a phosphate salt may be blended with an encapsulating salt. The blended salts may be subjected to heat at a temperature above the melting temperature of the encapsulating salt such that the encapsulating salt begins to fuse. The heated salt mixture may be cooled to produce an encapsulated phosphate salt, referred to as capsule 850.

Similarly, in some embodiments, granular TSP may be used. Granular TSP may not produce as much dust during dispensing and may prevent the bath from otherwise clouding. Granulated TSP may have a coarse texture that quickly settles in the bath, and in some embodiments, granular TSP may more readily dissolve than the encapsulated powder based on the size and surface area of the coarse particles. However, granular TSP may absorb moisture faster than encapsulated TSP during storage.

In some embodiments, the phosphate salt may be a sodium phosphate, such as trisodium phosphate or disodium phosphate. The encapsulating salt may be a nitrate salt, such as potassium nitrate or sodium nitrate. The encapsulating salt may be used in fine crystal, pellet, or granular form. In some embodiments, the encapsulating salt may have a lower melting temperature than the phosphate salt, such that upon heating the encapsulating salt melts and fuses around the substantially non-melted phosphate salt to create a capsule 850. In some embodiments, the melted salt may be cooled to room temperature (21° C.) or may be cooled at a temperature sufficient to form the capsule 850. For instance, the melted salt may be cooled to any temperature below the glass transition temperature ($T_g$) of the encapsulating salt. As shown below with reference to FIG. 17, in some embodiments, the capsule 850 may be able to react with lithium cations 130 at substantially the same rate as the powder 810.

The following examples illustrate one or more embodiments of the present disclosure as previously discussed above. The description of the embodiments is illustrative in nature and is in no way intended to be limiting it its application or use.

EXAMPLES

Example 1

Lithium Poisoned Molten Salt of Sodium Nitrate

A molten salt of sodium nitrate ($NaNO_3$) containing 0.32 wt % of lithium nitrate ($LiNO_3$) was characterized by inductively coupled plasma optical emission spectrometry (ICP-OES). Into this salt, 1 wt % of sodium phosphate ($Na_3PO_4$) was added to precipitate the lithium cations at 380° C. The treated molten salt was sampled and characterized by ICP-OES. Results showed that lithium cations were successfully removed from molten salt (liquid phase). The concentration of $LiNO_3$ was below the detection limit of ICP-OES (<0.005 wt %).

Example 2

Lithium Poisoned Molten Salt of Sodium Nitrate and Potassium Nitrate

The molten salt of 49 wt % of sodium nitrate (NaNO3) and 51 wt % of potassium nitrate ($KNO_3$) contained 0.02 wt % of lithium nitrate ($LiNO_3$) characterized by ICP-OES. Into this salt, 1 wt % of trisodium phosphate (TSP, $Na_3PO_4$) was added to precipitate the lithium cations at 380° C. The treated molten salt was sampled and characterized by ICP-OES. Results showed that lithium cations were successfully removed from molten salt (liquid phase). The concentration of $LiNO_3$ was below the detection limit of ICP-OES (<0.005 wt %).

Example 3

Lithium Poisoned Molten Salt of Sodium Nitrate and Potassium Nitrate

Mixtures of 49 wt % of sodium nitrate ($NaNO_3$) and 51 wt % of potassium nitrate ($KNO_3$) containing 0.5-1.0 wt % of lithium nitrate ($LiNO_3$) and 0-2.5 wt % of disodium phosphate (DSP, $Na_2HPO_4$) were melted at 380° C. for 12 hours. Then, glass substrate (0.8 mm thickness, lithium-containing glass) were strengthened (ion-exchanged) in these baths for 3 hr. and 45 min. at 380° C. The strengthened glasses were cleaned and the compressive stress (CS) was measured by FSM (see Table 1, below). The lithium concentrations (in terms of LiNO3) of molten salt samples were analyzed by ICP-OES (see Table 1, below).

Results showed that lithium cations can be effectively stratified by the addition of phosphate (in this case, DSP). ICP data indicates lithium cation concentrations can be significantly reduced within 12 hours at 380° C. Using these baths for ion exchange, the CS was partially or completely recovered with the addition of DSP. Overdosing DSP helps a faster stratification process (see FIG. 8).

Figure 8:
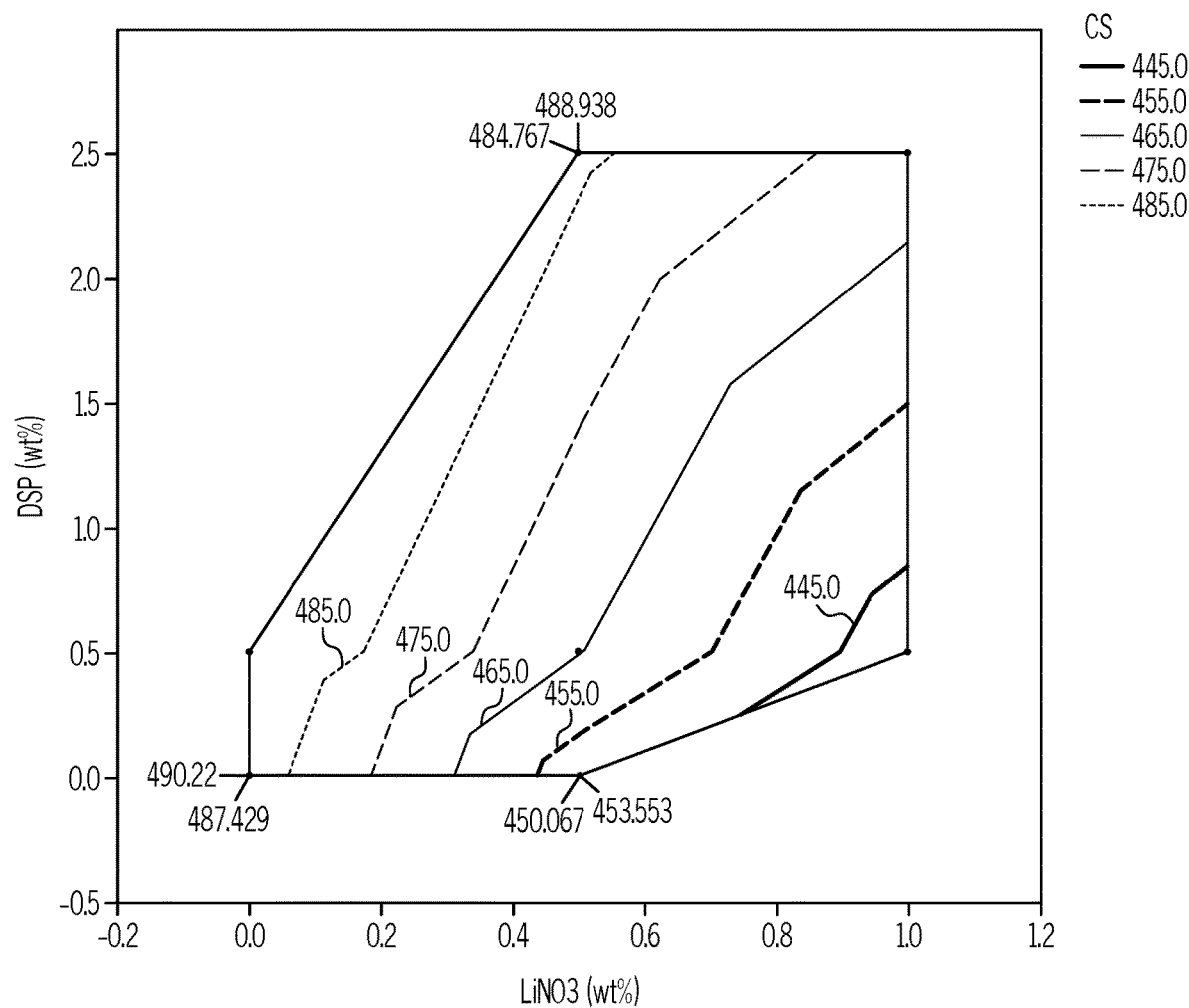
FIG. 8 is a contour plot of the compressive stress (CS) of ion-exchangeable substrates at different dosing concentrations of $LiNO_3$ and disodium phosphate (DSP), according to embodiments disclosed and described herein.

FIG. 8 is a contour plot of the compressive stress (CS) of ion exchanged glass substrates at different dosing concentrations of $LiNO_3$ and disodium phosphate (DSP), as discussed in detail in Example 3. FIG. 8 depicts five ion exchanged glass substrates with differing surface compressive stresses due to different ion exchange conditions (i.e., the concentration of DSP and lithium nitrate salt in the bath). The five ion exchange glasses have compressive stresses of 445.0 megapascals (MPa), 455.0 MPa, 465.0 MPa, 475.0 MPa, and 485.0 MPa. The contour plot shows the dosing concentrations of $LiNO_3$ in wt % versus the concentration of disodium phosphate (DSP) in wt %. As can be seen from FIG. 8, the compressive stress of the ion-exchanged substrates generally decreases as $LiNO_3$ content increases.

TABLE 1

Stratification of Lithium Cations by DSP

| Conditions | Added $LiNO_3$ (wt %) | Added DSP (wt %) | Soluble $LiNO_3$ in bath after 12 hours (wt %) | Average CS of the strengthened glass (MPa) |
|---|---|---|---|---|
| 1 | 0 | 0.5 | 0 | 495 |
| 2 | 0 | 0 | 0 | 490 |
| 3 | 0.5 | 0 | 0.43 | 450 |
| 4 | 0.5 | 0.5 | 0.3 | 465 |
| 5 | 0.5 | 0.5 | 0.22 | 465 |
| 6 | 1 | 0.5 | 0.72 | 440 |
| 7 | 0.5 | 2.5 | 0.05 | 487 |
| 8 | 1 | 2.5 | 0.13 | 470 |

For all conditions the concentration of $KNO_3$ and $NaNO_3$ were 51 wt %, and 49 wt %, respectively.

Example 4

Trisodium Phosphate Bath Regeneration

To determine the effectiveness of trisodium phosphate (TSP, $Na_3PO_4$) in precipitating lithium to regenerate a salt bath, 1 wt % TSP was pre-loaded in a 3 kg molten salt bath comprising 49 wt % $NaNO_3$ and 51 wt % $KNO_3$. The salt bath was maintained at a temperature of 380° C. and 25 samples of Example Glass 1, a glass composition according to the embodiments described herein (composition described below in Table 2), were added to the bath. The glass pieces were 50 mm×50 mm×0.8 mm sheets of glass, inserted into the salt bath for 3 hr. and 45 min. The ion exchange process was repeated for 15 runs. For purposes of comparison, a second salt bath comprising 16 kg of 49 wt % $NaNO_3$ and 51 wt % $KNO_3$ with 0.5 wt % silicic acid (Si(OH)$_4$ was melted to replicate a standard commercial ion exchange bath. The second salt bath was maintained at a temperature of 380° C. and 120 samples of Example Glass 1 were added to the bath and ion exchanged for 3 hr. and 45 min. The ion exchange process was repeated for 6 runs. The compressive stress (CS) of the glass samples was determined after each run as a measure of the degree of poisoning of the salt bath. That is, it was expected that the compressive stress of the samples would decrease for each consecutive run due to the increasing concentration of lithium in the bath as a result of ion exchange.

Figure 9:
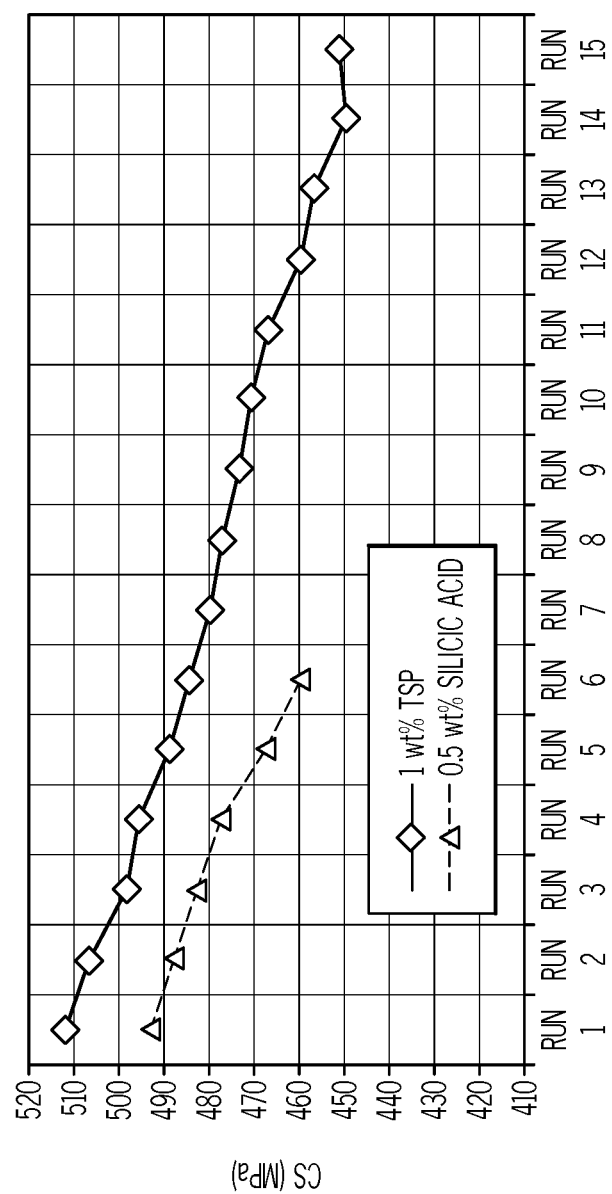
FIG. 9 is a graph of the compressive stress of glass articles after each run in a salt bath containing 1 wt % trisodium phosphate and a bath containing 0.5% silicic acid according to embodiments disclosed and described herein.

FIG. 9 shows the compressive stress of the glass samples after each run of Example 4 for the bath containing 1 wt % TSP and the bath containing 0.5 wt % silicic acid. As shown in FIG. 9, the bath containing 1 wt % TSP generally yielded higher compressive stresses than the bath containing 0.5 wt % silicic acid. The data also indicates that the decrease in compressive stress in the bath containing 0.5 wt % silicic acid was more pronounced (i.e., the CS curve had a steeper slope) as the number of runs increased than the bath containing 1 wt % TSP. While not wishing to be bound by theory, it is believed that this trend is the result of lithium poisoning in the bath containing 0.5 wt % silicic acid while the bath containing 1 wt % TSP at least partially mitigated the effects of lithium poisoning.

Figure 10:
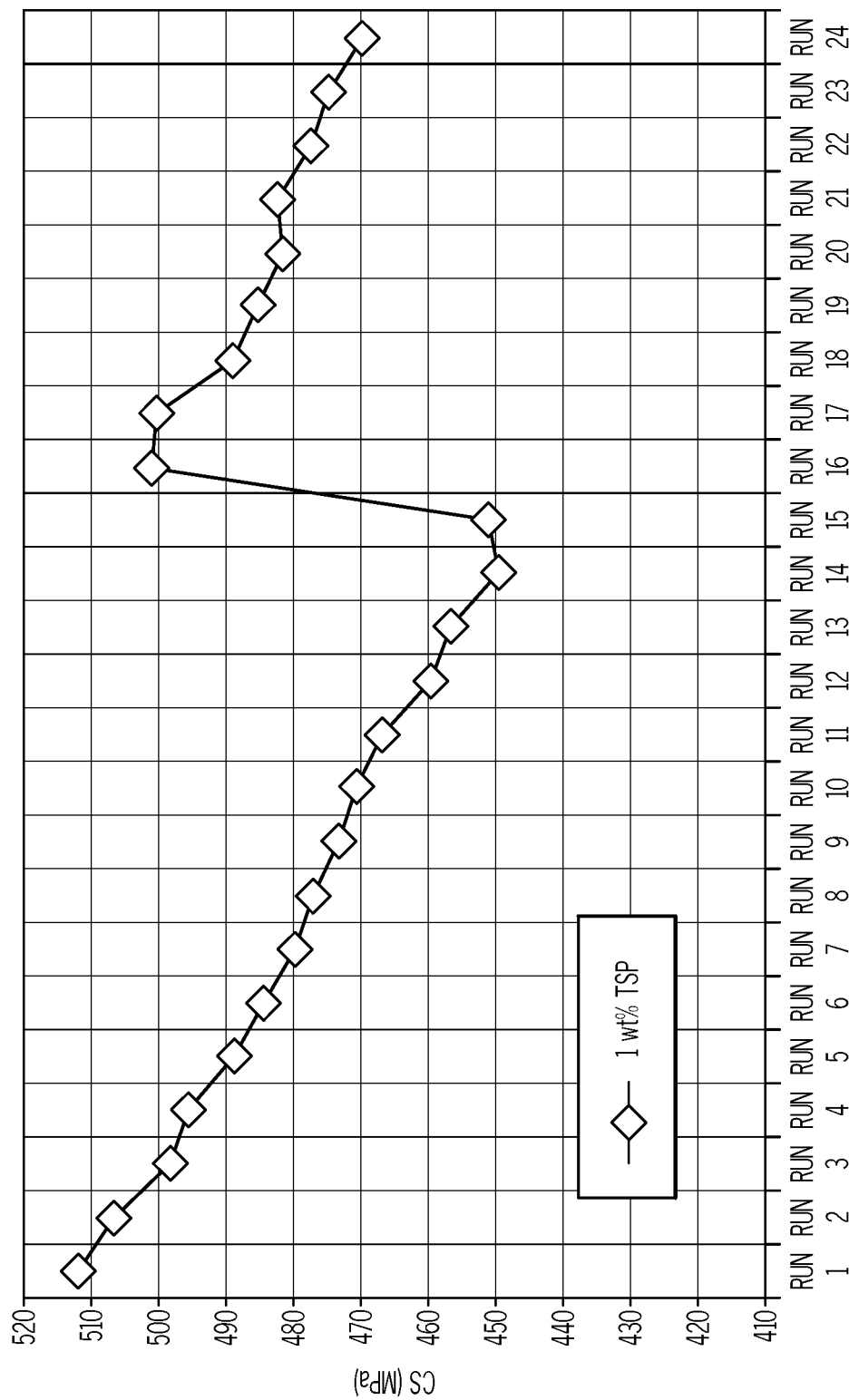
FIG. 10 is a graph of the compressive stress of glass articles after each run in a salt bath containing 1 wt % trisodium phosphate following regeneration of the salt bath with the addition of 2 wt % trisodium phosphate according to embodiments disclosed and described herein.

In addition, to determine the effectiveness of regenerating the salt bath containing 1 wt % TSP, an additional 2 wt % TSP was added to the salt bath containing TSP after run 15. This "spike" of TSP regenerated the salt bath by precipitating out the poisoning lithium cations. As shown in FIG. 10, after run 15, when the additional 2 wt % TSP was added to the salt bath, the compressive stress of the glass samples increased from 460 MPa to 500 MPa. This demonstrates that, after regeneration, the salt bath is able to produce glass pieces with similar compressive stresses as those in the original, fresh salt bath that has not been poisoned (i.e., as shown in FIG. 9).

Regeneration of the bath by the addition of TSP produced glass samples with compressive stresses over 440 MPa after 30 runs in the same salt bath. In prior ion exchange processes (i.e., without regeneration), the salt bath would need to be changed after only 7-8 runs or batches. By increasing the time and the amount of batches of glass that may be ion exchanged before the molten salt bath must be cooled, cleaned, replaced and reheated, production efficiencies are improved and production costs are decreased.

TABLE 2

| Composition of Example Glass 1 | |
| --- | --- |
| Example Glass 1 | Mol % Oxide |
| SiO$_2$ | 63.46 |
| Al$_2$O$_3$ | 15.71 |
| B$_2$O$_3$ | 0 |
| Li$_2$O | 6.37 |
| Na$_2$O | 10.69 |
| MgO | 0.06 |
| ZnO | 1.15 |
| P$_2$O$_5$ | 2.45 |
| SnO$_2$ | 0.04 |

Example 5

Trisodium Phosphate Pre-loading

To determine the amount of TSP that could be pre-loaded into the salt bath to prevent lithium poisoning, three salt bath tanks were artificially poisoned with LiNO$_3$, as shown in Table 3 below. In the first salt bath, labeled "Tank 1," 1.56 wt % of LiNO$_3$ was used to artificially poison a 3 kg bath comprising 49% NaNO$_3$ and 51% KNO$_3$. The bath was maintained at a temperature of 380° C. 2.5 wt % TSP was added to the poisoned bath. Once the constituents had settled in the bath, 25 pieces of glass according to Example Glass 1 were added. The glass pieces were ion exchanged for 3 hr. and 45 min. The compressive stress in the glass was measured after ion exchange and determined to be 466.7 MPa, an acceptable value for commercial production.

Similarly, in the second salt bath, labeled "Tank 2," 6.25 wt % of LiNO$_3$ was used to artificially poison a 3 kg bath comprising 49% NaNO$_3$ and 51% KNO$_3$. The bath was maintained at a temperature of 380° C. 10 wt % TSP was added to the poisoned bath. Once the constituents had settled in the bath, 25 pieces of glass according to Example Glass 1 were added to the bath and ion exchanged for 3 hr. The compressive stress of the glass was measured after ion exchange and determined to be 464.7 MPa with no cloudiness on the glass surface to indicate impurities.

The data in Table 3 demonstrates that large amounts of lithium poisoning may be overcome by pre-loading up to 10 wt % TSP in the salt bath to prevent lithium poisoning. More specifically, the data demonstrates that the lithium poisoning can be overcome by maintaining the ratio of LiNO$_3$ to TSP as the concentration of LiNO$_3$ in the bath increases without adversely affecting the compressive stress imparted to the glass. The data also confirmed that by pre-loading up to 10 wt % TSP into the salt bath, the life of the salt bath could be extended by at least 70 runs without the need for regeneration.

TABLE 3

| Compressive Stress using 2.5 wt % and 10 wt % TSP | | | | | | | |
| --- | --- | --- | --- | --- | --- | --- | --- |
| Experiment | Number of Pieces | Tank/Salt Vol. (kg) | TSP (g) | LiNO$_3$/ TSP | LiNO$_3$ (wt %)/ | TSP (ppm) | CS (MPa) |
| Artificially poisoned Tank 1, with 2.5% TSP, 1.56% LiNO$_3$ | 25 | 3 | 75 | 0.62 | 0.28 | 130 | 466.7 |
| Artificially poisoned Tank 2, with 10% TSP, 6.25% LiNO$_3$ | 25 | 3 | 300 | 0.62 | 0.23 | <50 | 464.7 |

Example 6

Disodium Phosphate Bath Regeneration

To determine the effectiveness of disodium phosphate (DSP, $Na_2HPO_4$) in precipitating lithium to regenerate a salt bath, 2.5 wt % DSP was pre-loaded in a 3 kg molten salt bath comprising 49 wt % $NaNO_3$ and 51 wt % $KNO_3$. The salt bath was maintained at a temperature of 380° C. and 25 samples of Example Glass 1, a glass composition according to the embodiments described herein (composition described above), were added to the bath. The glass pieces were 50 mm×50 mm×0.8 mm sheets of glass, inserted into the salt bath for 3 hours and 45 minutes.

Figure 11:
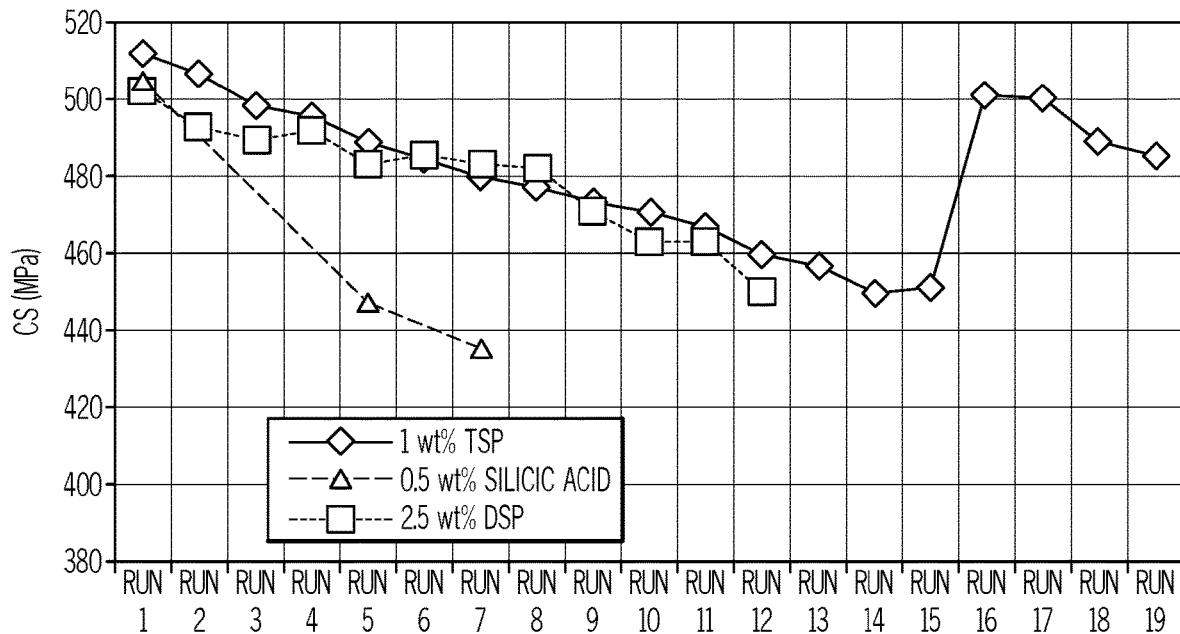
FIG. 11 is a graph of the compressive stress of glass articles after each run in a salt bath containing 1 wt % trisodium phosphate compared to the compressive stress of glass articles after each run in a salt bath containing 2.5 wt % disodium phosphate and 0.5 wt % silicic acid according to embodiments disclosed and described herein.

FIG. 11 shows a comparison between Example 4 (TSP Regeneration), Example 5 (DSP Regeneration), and silicic acid only (no phosphate addition). As shown in FIG. 11, DSP is slightly less effective than TSP in salt bath regeneration, but is more effective than silicic acid alone.

Figure 12:
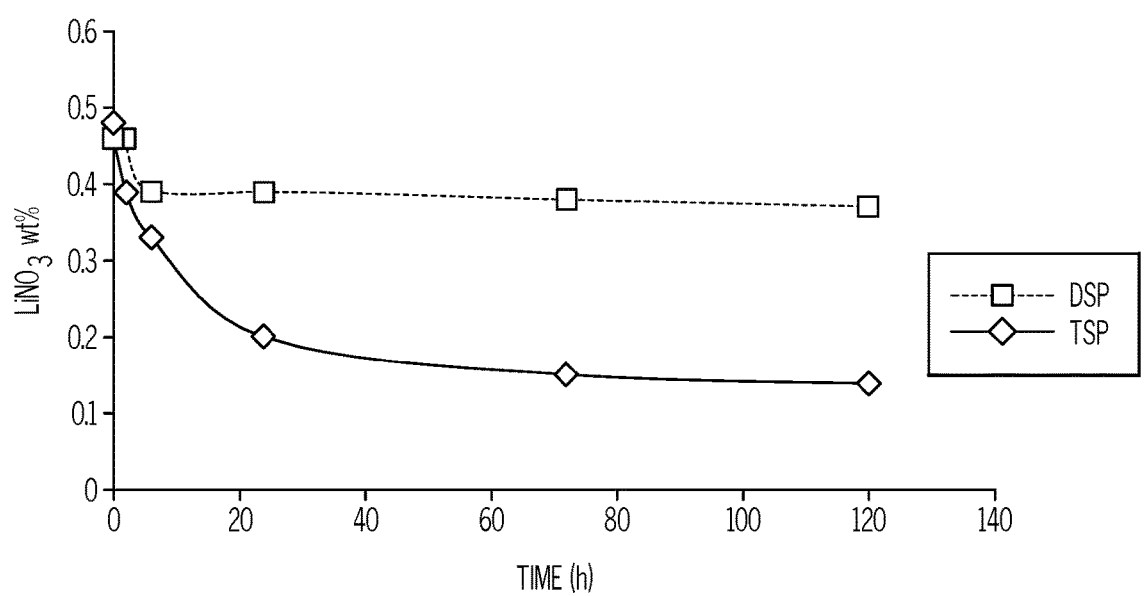
FIG. 12 is a graph of the concentration of $LiNO_3$ present in two salt baths in which one bath contains trisodium phosphate and the other contains disodium phosphate according to embodiments disclosed and described herein.

TSP exhibited superior regeneration capability when compared to DSP over longer periods of time, as shown FIG. 12. Particularly, FIG. 12 shows the results of two salt baths of 49% $NaNO_3$ and 51% $KNO_3$ at 380° C. Both salt baths contained 0.495 wt % $LiNO_3$ pre-loaded to artificially poison the salt baths. To the poisoned salt bath of Tank 1, 0.37 wt % DSP was added. To the poisoned salt bath of Tank 2, 0.43 wt % TSP was added (equivalent to a 1.1 molar ratio of DSP and TSP). The wt % of $LiNO_3$ in the bath was tested over a period of hours. While DSP and TSP show similar results after 5-10 hours, after 24 hours, TSP shows a decreased level of $LiNO_3$ when compared to DSP. Further, after a period of 5 days (120 hours), the tank containing TSP has a lower concentration of $LiNO_3$ when compared to the tank containing DSP.

Example 7

Surface Defects

Figure 13:
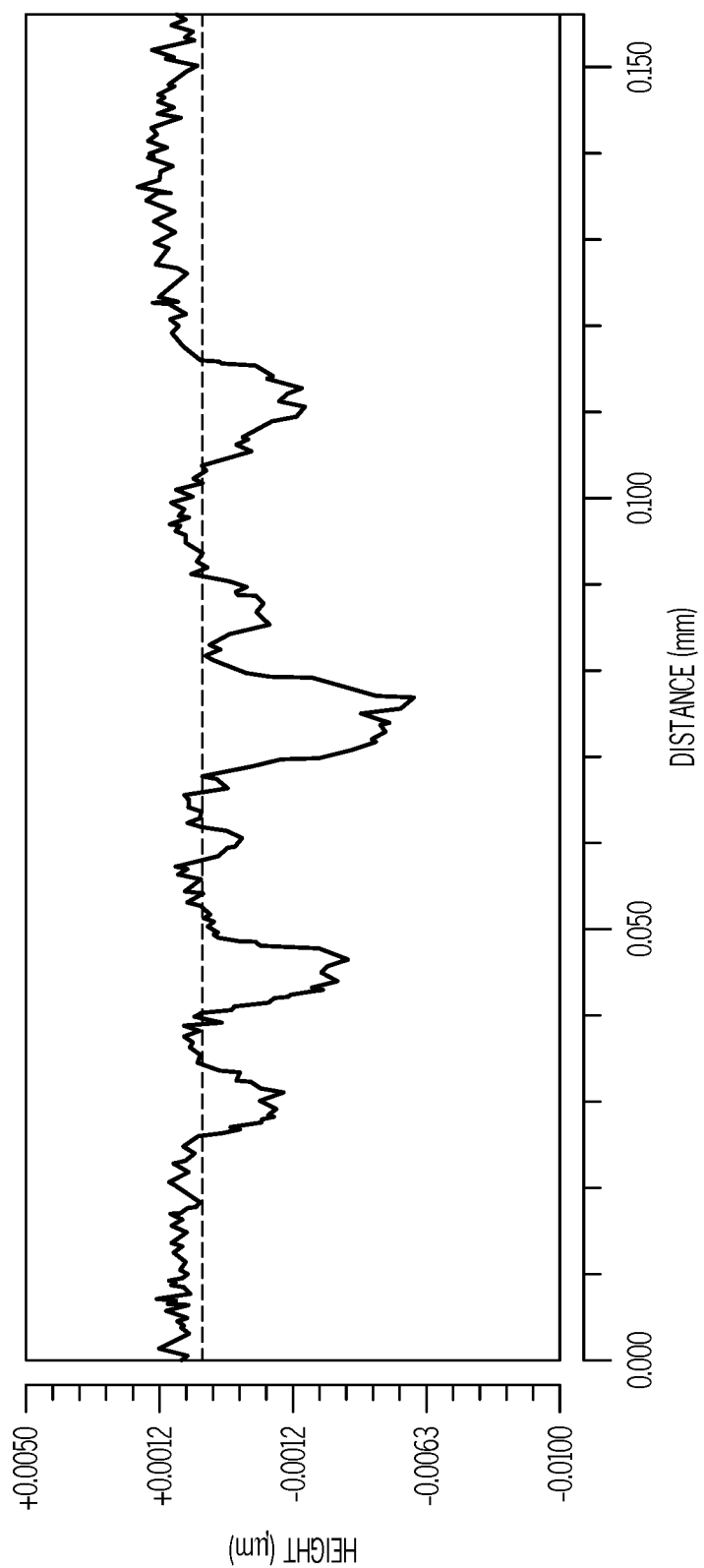
FIG. 13 is a graph of the surface profile of an ion-exchangeable substrate having a surface defect, as measured using Zygo 3D imaging and surface metrology.

FIG. 13 depicts a characterization of the surface defects present on a glass substrate following an ion exchange process in which the salt bath was regenerated with trisodium phosphate salt (TSP). FIG. 13 is a graph of the Zygo measurements, a 3-dimensional (3D) imaging and surface metrology tool which depicts the surface profile of the glass sheet. As the ion exchange process occurred, the TSP began to precipitate out the lithium cations to form lithium phosphate salts. As the lithium concentration diminished, the excess TSP began to react with the potassium present in the glass substrate, causing an influx of sodium cations into the glass substrate, while phosphate crystals comprising $K_3PO_4$ were formed. Upon removing the glass article from the bath and cooling the glass article, water was used to try to wash off the phosphate crystals. As the large phosphate crystals were removed from the glass substrate, surface defects were noticed on the glass substrate. As shown in FIG. 13, the surface profile of the glass substrate depicts both depressions and protrusions on the surface of the glass substrate. Additionally, some of the depressions were quite large in nature, up to 2 to 5 nm in depth, with most depressions showing a length of a few micrometers and a depth of a few nanometers.

Example 8

Surface Defects and Cooling Rate

Figure 14:
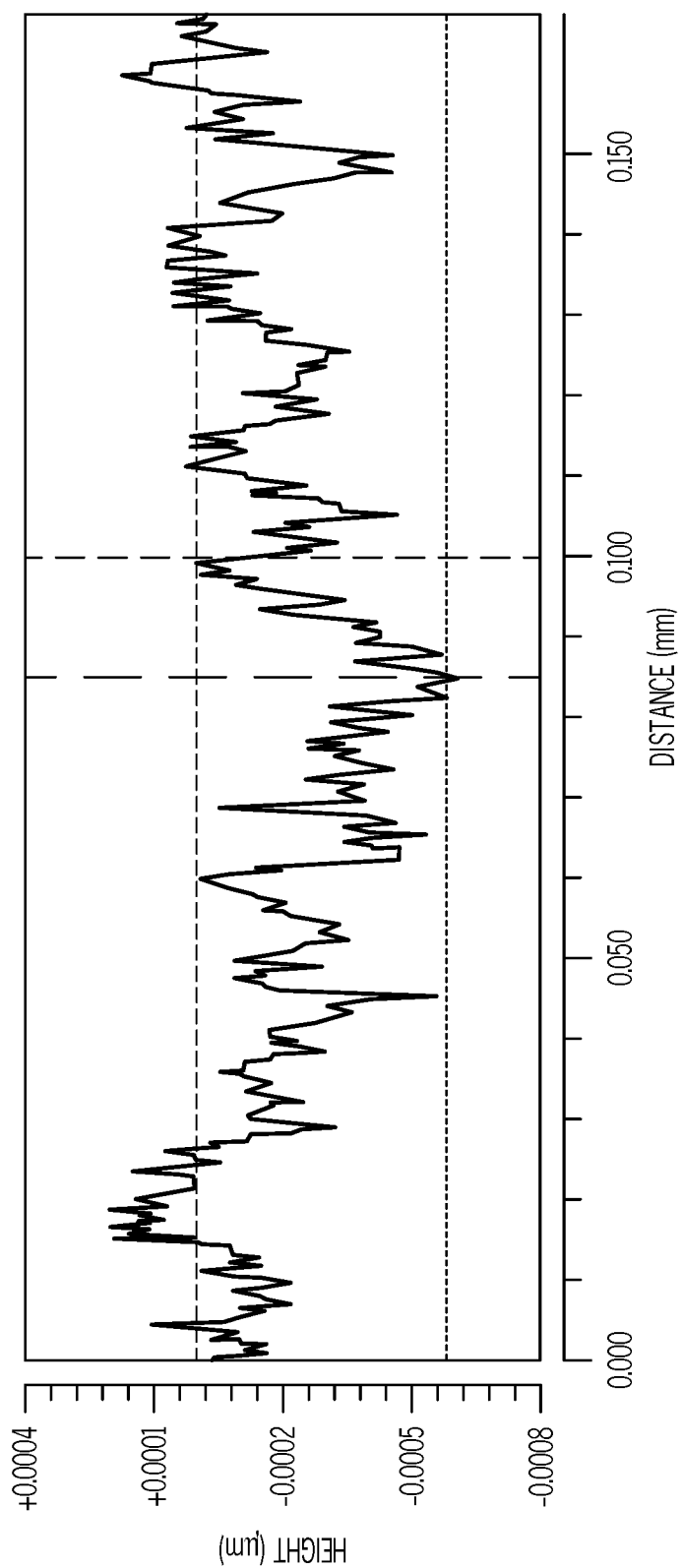
FIG. 14 is a second graph of the surface profile of a defect-free ion-exchangeable substrate, as measured using Zygo 3D imaging and surface metrology, according to embodiments shown and described herein.

FIG. 14 shows the Zygo reading for a glass substrate that was rapidly cooled upon removal from the bath. As previously discussed, rapid cooling may reduce or restrict the formation of phosphate crystals, and thus, surface defects, on the ion-exchangeable substrate. In Example 8, a glass article was ion exchanged in a 3 kg bath comprising 49% $NaNO_3$ and 51% $KNO_3$. The bath was maintained at a temperature of 380° C. 10 wt % TSP was added to the bath to prevent and remedy lithium poisoning. The glass article was removed from the bath and immediately cooled from a temperature of 380° C. to a temperature of less than 100° C. in one minute. As shown in FIG. 14, the surface defects are much smaller in length and width with very few protrusions.

Example 9

Surface Defects and Bath Temperature

Figure 15:
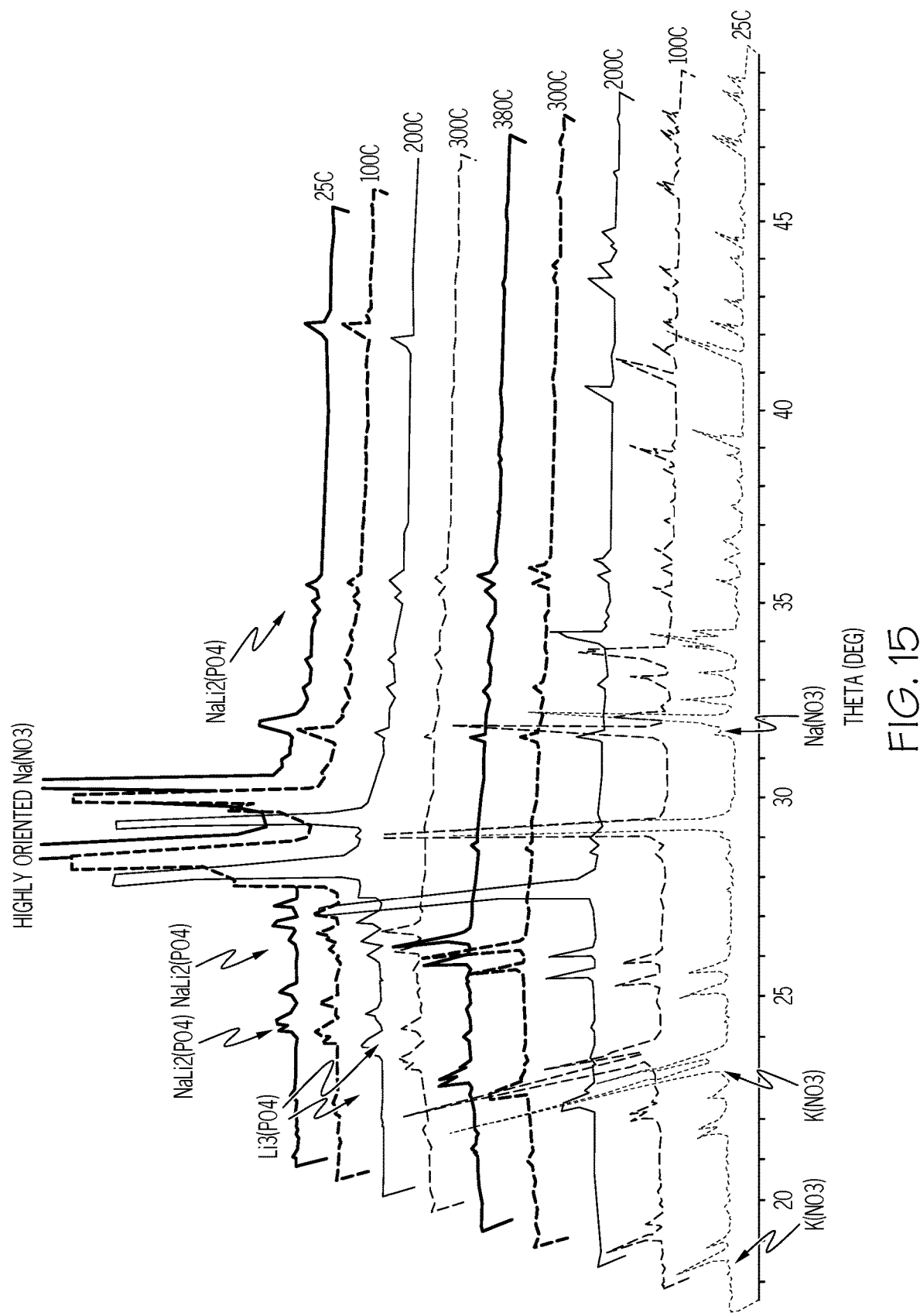
FIG. 15 is a graph of a high temperature x-ray diffraction analysis of a molten salt bath containing $KNO_3$, $NaNO_3$, and a small amount of lithium sodium phosphate according to embodiments shown and described herein.

FIG. 15 depicts an in-situ high temperature x-ray diffraction (XRD) pattern as a function of temperature and intensity for a molten salt bath containing $KNO_3$, $NaNO_3$, and a small amount of lithium sodium phosphate. As shown in FIG. 15, at higher bath temperatures, such as 380° C., the only crystals that were present in the molten salt bath were lithium sodium phosphate, $Li_2NaPO_4$ salts, which remained in a crystalline form. At lower temperatures, the crystals from the other salts (such as $KNO_3$, $NaNO_3$ and $Li_3PO_4$) were more prevalent. As the molten salt bath was heated to a temperature of 380° C. and then cooled to room temperature, above 300° C. only lithium sodium phosphate remained present in a crystalline state. Below 300° C., both when the bath was being cooled from 380° C. and when the bath was being heated from room temperature, other crystalline phases existed from crystalline salts present in the bath.

Example 10

Phosphate Salt Reaction Time

Figure 16:
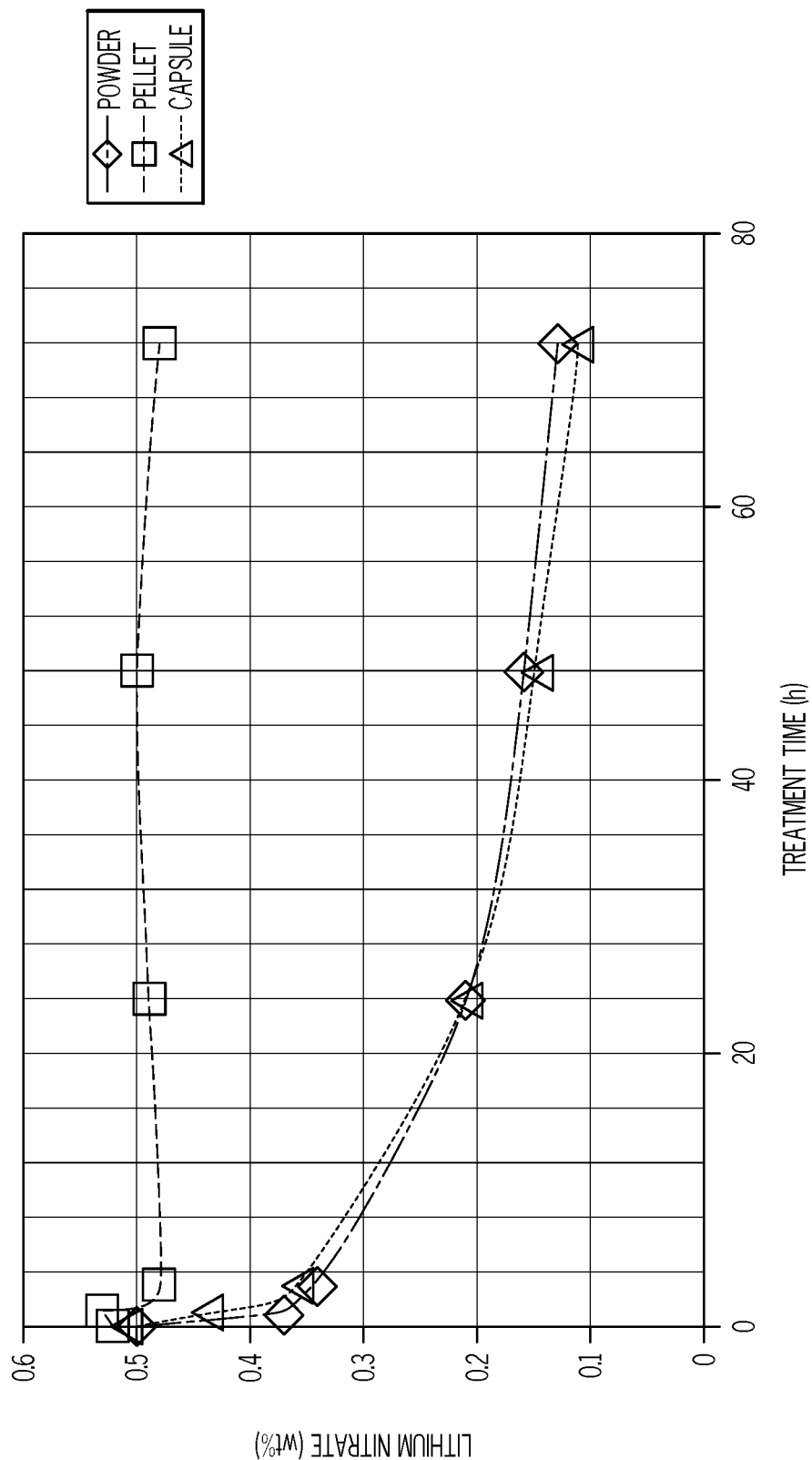
FIG. 16 is a graph of the effective speed of the phosphate salt powder, pellet, and capsule, according to embodiments shown and described herein.

FIG. 16 depicts the differences between adding phosphate salt to a molten salt bath in a powdered, pellet, and capsule formulation, as discussed previously. In Example 10, trisodium phosphate was added to molten salt baths in a powder form, a pellet form, and a capsule form for a treatment time of 75 hours. To produce the capsules, 1 kg of trisodium phosphate, 2 kg $KNO_3$, and 1.125 kg of $NaNO_3$ were mixed thoroughly in a stainless steel container. The mixture was placed in an oven and heated to a temperature of 390° C. The temperature of 390° C. was substantially maintained for 3 hours. The mixture was then removed and cooled to room temperature. Once cooled, the capsule was separated from the stainless steel container.

As shown in FIG. 16, the encapsulated phosphate powder was able to react in the molten salt bath with the lithium nitrate to precipitate out lithium phosphate salts at substantially the same rate as the powdered form. Contrastingly, the pellet form was not able to react as quickly, resulting in a higher concentration of lithium nitrate, present and unreacted in the bath. The capsule did not cloud the salt bath while still quickly and efficiently reacting with the lithium nitrate, making the capsule a superior choice to the powdered or pellet forms of trisodium phosphate, or other encapsulated phosphate salts.

Example 11

Bath pH

Figure 17:
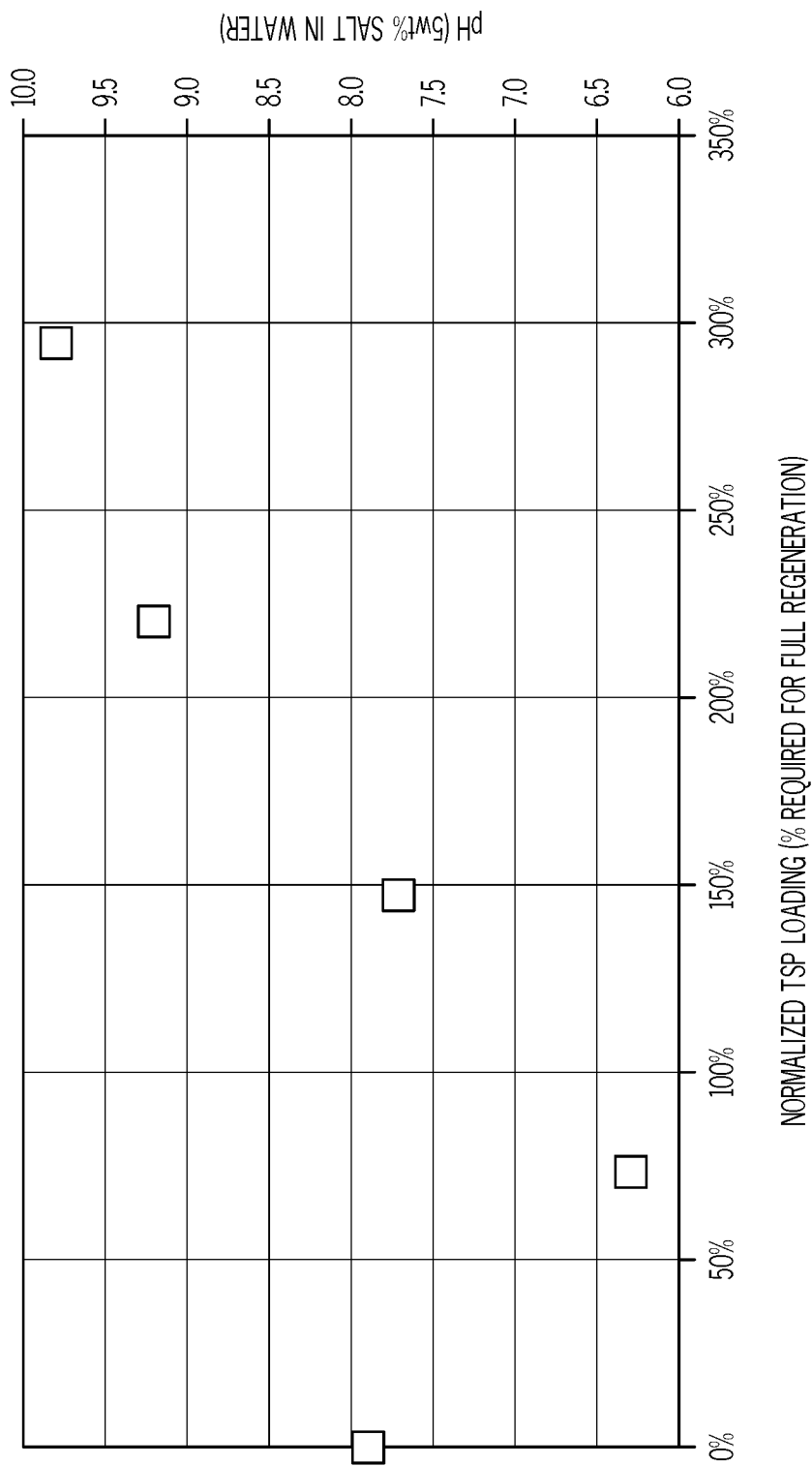
FIG. 17 is a graph of the pH of a salt bath after adding various amounts of trisodium phosphate to the salt bath, according to embodiments shown and described herein.

FIG. 17 is a graph of the pH of the salt bath at varying amounts of trisodium phosphate. In Example 11, a 3 kg bath comprising 49% NaNO$_3$ and 51% KNO$_3$ was heated and maintained at a temperature of 380° C. Trisodium phosphate (TSP) was added to the bath in accordance with the below equation:

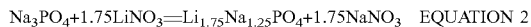

Na$_3$PO$_4$+1.75LiNO$_3$=Li$_{1.75}$Na$_{1.25}$PO$_4$+1.75NaNO$_3$  EQUATION 2

The pH was measured by dissolving 5 wt % of the salt in an aqueous solution and measuring the pH at room temperature (approximately 20 to 25° C.). In FIG. 17 the salt bath had a pH of from 6 to 10 as TSP is added to the bath. Without the addition of TSP, the bath had a pH of about 7.8. Upon the addition of TSP, the pH of the bath initially dropped to about 6.3. As more TSP was added to the salt bath, the pH rose to 7.6, then to 9.2, and then 9.8 as the concentration increased, as shown in FIG. 17.

It should be apparent to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

What is claimed is:

1. A method for regenerating a salt bath comprising:
   contacting at least a portion of an ion-exchangeable substrate comprising lithium cations with a salt bath comprising at least one of KNO$_3$ and NaNO$_3$,
   wherein upon contacting the at least a portion of the ion-exchangeable substrate with the salt bath, the ion-exchangeable substrate diffuses lithium cations from the ion-exchangeable substrate at a rate of greater than or equal to 1,000 μm$^2$/hr and less than or equal to 8,000 μm$^2$/hr; and
   selectively precipitating, not during the contacting, dissolved lithium cations from the salt bath by adding greater than or equal to 2 wt % and less than or equal to 10.0 wt % of a phosphate salt,
   wherein the concentration of lithium cations in the bath, after the adding, is greater than or equal to the concentration of phosphate salt in the salt bath, and
   wherein the concentration of dissolved lithium cations in the salt bath, after the selectively precipitating, is greater than or equal to 0 wt % lithium cations and less than or equal to 2.0 wt % lithium cations.

2. The method for regenerating a salt bath of claim 1, wherein the ion-exchangeable substrate comprises greater than or equal to 2.0 mol % Li$_2$O and less than or equal to 15 mol % Li$_2$O.

3. The method for regenerating a salt bath of claim 1, wherein the ion-exchangeable substrate comprises:
   greater than or equal to 50 mol % SiO$_2$ and less than or equal to 80 mol % SiO$_2$;
   greater than or equal to 0 mol % B$_2$O$_3$ and less than or equal to 5 mol % B$_2$O$_3$;
   greater than or equal to 5 mol % Al$_2$O$_3$ and less than or equal to 30 mol % Al$_2$O$_3$;
   greater than or equal to 2 mol % Li$_2$O and less than or equal to 25 mol % Li$_2$O;
   greater than or equal to 0 mol % Na$_2$O and less than or equal to 15 mol % Na$_2$O;
   greater than or equal to 0 mol % MgO and less than or equal to 5 mol % MgO;
   greater than or equal to 0 mol % ZnO and less than or equal to 5 mol % ZnO;
   greater than or equal to 0 mol % SnO$_2$ and less than or equal to 5 mol % SnO$_2$; and
   greater than or equal to 0 mol % P$_2$O$_5$ and less than or equal to 10 mol % P$_2$O$_5$.

4. The method for regenerating a salt bath of claim 1, wherein the salt bath has a pH of less than or equal to 10, as measured by dissolving 5 wt % of the salt in aqueous solution and measuring the pH at room temperature.

5. The method for regenerating a salt bath of claim 1, wherein the salt bath has a alkaline pH of greater than or equal to 6 and less than or equal to 10, as measured by dissolving 5 wt % of the salt in aqueous solution and measuring the pH at room temperature.

6. The method for regenerating a salt bath of claim 1, further comprising
   removing the ion-exchangeable substrate from the bath and
   cooling the ion-exchangeable substrate to a temperature of less than or equal to 100° C. in less than or equal to 3 minutes.

7. The method of claim 6, wherein the ion-exchangeable substrate is cooled to a temperature of less than or equal to 100° C. in from 30 seconds to 3 minutes.

8. The method for regenerating a salt bath of claim 1, wherein the phosphate salt is selected from the group consisting of Na$_3$PO$_4$, K$_3$PO$_4$, and combinations thereof.

9. The method for regenerating a salt bath of claim 1, wherein the phosphate salt is added to the salt bath as an encapsulated powder.

10. The method for regenerating a salt bath of claim 9, wherein the encapsulated powder comprises KNO$_3$, NaNO$_3$, or combinations thereof.

11. The method for regenerating a salt bath of claim 1, wherein the phosphate salt is added to the bath in a granular form.

12. The method for regenerating a salt bath of claim 1, wherein the salt bath comprises greater than or equal to 45 mol % KNO$_3$ and less than or equal to 67 mol % KNO$_3$, and greater than or equal to 33 mol % NaNO$_3$ and less than or equal to 55 mol % NaNO$_3$.

13. The method for regenerating a salt bath of claim 1, wherein the salt bath comprises greater than or equal to 75 mol % KNO$_3$ and less than or equal to 95 mol % KNO$_3$, and greater than or equal to 5 mol % NaNO$_3$ and less than or equal to 25 mol % NaNO$_3$.

14. The method for regenerating a salt bath of claim 1, wherein after the adding the salt bath comprises greater than or equal to 2 wt % and less than or equal to 3.0 wt % of the phosphate salt.

15. The method for regenerating a salt bath of claim 1, wherein the dissolved lithium cations are selectively precipitated by reacting with the phosphate salt thereby forming at least one of insoluble Li$_3$PO$_4$, insoluble Li$_2$NaPO$_4$ or insoluble LiNa$_2$PO$_4$.

16. The method for regenerating a salt bath of claim 1, wherein the ion-exchangeable substrate has a diffusion rate of from greater than or equal to 2,000 μm$^2$/hr and less than or equal to 6,000 μm$^2$/hr.

17. The method for regenerating a salt bath of claim 1, further comprising adding additional phosphate salt to the salt bath when a compressive stress of a substrate treated in a salt bath containing diffused lithium cations is from 10 MPa to 70MPa less than a compressive stress of a substrate treated in a salt bath that does not contain diffused lithium cations.

* * * * *